(12) United States Patent
Berdinis et al.

(10) Patent No.: US 10,896,401 B2
(45) Date of Patent: Jan. 19, 2021

(54) COORDINATING SHIPMENTS ON FREIGHT VEHICLES

(71) Applicant: Uber Technologies, Inc., San Francisco, CA (US)

(72) Inventors: Eric Berdinis, San Francisco, CA (US); John Stauffer, San Francisco, CA (US); Adam Bentley, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 110 days.

(21) Appl. No.: 15/867,407

(22) Filed: Jan. 10, 2018

(65) Prior Publication Data

US 2018/0211218 A1    Jul. 26, 2018

Related U.S. Application Data

(63) Continuation of application No. 15/412,559, filed on Jan. 23, 2017.

(51) Int. Cl.
*G06Q 10/08* (2012.01)
*G06Q 10/06* (2012.01)
*G05D 1/02* (2020.01)

(52) U.S. Cl.
CPC ..... *G06Q 10/08355* (2013.01); *G05D 1/0212* (2013.01); *G05D 1/0291* (2013.01);
(Continued)

(58) Field of Classification Search
CPC ....... G06Q 10/08355; G06Q 10/06315; G06Q 10/08345; G05D 2201/0213
(Continued)

(56) References Cited

U.S. PATENT DOCUMENTS 3,953,720 A    4/1976 Kelch
5,880,958 A    3/1999 Helms
(Continued)

FOREIGN PATENT DOCUMENTS

CN    101951545    1/2011
CN    103692969    4/2014
(Continued)

OTHER PUBLICATIONS

ISR and Written Opinion issued in PCT/US2017/066765 dated Apr. 13, 2018.
(Continued)

*Primary Examiner* — Vanel Frenel
(74) *Attorney, Agent, or Firm* — Mahamedi IP Law LLP

(57) ABSTRACT

A shipment system can coordinate a less-than-truckload shipment with one or more freight vehicles by receiving from a first computing device, data corresponding to a new less-than-truckload shipment request. The data can comprise a pickup location, a delivery location, a pickup time, and a delivery time. Additionally, the shipment system can identify, from accessing a database, one or more trucks that are assigned to a current less-than-truckload shipment and are capable of executing the new less-than truckload shipment while completing the respective current-less-than-truckload shipment. A message corresponding to an invitation for executing the new less-than-truckload shipment can be transmitted to one or more operator computing devices of the identified one or more trucks capable.

20 Claims, 12 Drawing Sheets

(52) U.S. Cl.
CPC .. *G06Q 10/06315* (2013.01); *G06Q 10/08345* (2013.01); *G05D 2201/0213* (2013.01)

(58) Field of Classification Search
USPC ......... 705/335, 26.8, 412, 37; 700/216, 228; 235/376
See application file for complete search history.

(56) References Cited

U.S. PATENT DOCUMENTS

| | | |
|---|---|---|
| 6,456,207 B1 | 9/2002 | Yen |
| 6,516,056 B1 | 2/2003 | Justice et al. |
| 6,591,253 B1 | 7/2003 | Dinkin |
| 6,879,962 B1 | 4/2005 | Smith |
| 7,315,780 B2 | 1/2008 | Sugahara et al. |
| 7,353,181 B2 | 4/2008 | Nel |
| 7,385,529 B2 | 6/2008 | Hersh |
| 7,552,063 B1 | 6/2009 | McEachern |
| 7,561,069 B2 | 7/2009 | Horstmeyer |
| 8,131,307 B2 | 3/2012 | Lubeck et al. |
| 8,271,316 B2 | 9/2012 | Blackshaw et al. |
| 9,135,803 B1 | 9/2015 | Fields |
| 9,256,852 B1 | 2/2016 | Myllymaki |
| 9,478,150 B1 | 10/2016 | Fields |
| 9,552,564 B1 | 1/2017 | Martenis |
| 9,908,530 B1 | 3/2018 | Fields |
| 9,921,070 B1 | 3/2018 | Nimchuck |
| 9,955,326 B2 | 4/2018 | Avrahami |
| 2002/0034292 A1 | 3/2002 | Tuoriniemi et al. |
| 2002/0095308 A1 | 7/2002 | Pragelas |
| 2002/0138338 A1 | 9/2002 | Trauth et al. |
| 2002/0188517 A1 | 12/2002 | Banerjee |
| 2002/0194129 A1 | 12/2002 | Furuya et al. |
| 2003/0036935 A1 | 2/2003 | Nel |
| 2003/0087648 A1 | 5/2003 | Mezhvinsky et al. |
| 2003/0233190 A1* | 12/2003 | Jones .................... G06Q 10/08 701/465 |
| 2004/0106399 A1 | 6/2004 | Ki |
| 2004/0112959 A1 | 6/2004 | Jun |
| 2004/0158483 A1 | 8/2004 | LeCouturier |
| 2004/0219933 A1 | 11/2004 | Faith |
| 2004/0249699 A1* | 12/2004 | Laurent ................. G06Q 10/02 705/37 |
| 2004/0249818 A1 | 12/2004 | Isaac |
| 2004/0260470 A1 | 12/2004 | Rast |
| 2005/0096837 A1 | 5/2005 | Yoshizumi |
| 2005/0149382 A1 | 7/2005 | Fenner et al. |
| 2005/0227704 A1 | 10/2005 | Ferra et al. |
| 2005/0278063 A1 | 12/2005 | Hersh et al. |
| 2006/0059023 A1 | 3/2006 | Mashinsky |
| 2006/0136254 A1 | 6/2006 | Greenstein |
| 2006/0155460 A1 | 7/2006 | Raney |
| 2006/0195348 A1 | 8/2006 | Peterkofsky |
| 2006/0200306 A1 | 9/2006 | Adamcyzk |
| 2006/0200396 A1 | 9/2006 | Satterfield |
| 2006/0206387 A1 | 9/2006 | Peterkofsky |
| 2006/0217885 A1 | 9/2006 | Crady et al. |
| 2007/0103342 A1 | 5/2007 | Milleville |
| 2007/0221791 A1 | 9/2007 | Voelk |
| 2008/0086322 A1* | 4/2008 | Wallace ............. G06Q 30/0645 705/342 |
| 2008/0114629 A1 | 5/2008 | Pavlov |
| 2008/0125967 A1 | 5/2008 | Sprigg |
| 2008/0140597 A1 | 6/2008 | Satir |
| 2008/0158016 A1 | 7/2008 | Wang |
| 2008/0189207 A1 | 8/2008 | Wurster |
| 2008/0195428 A1 | 8/2008 | O'Sullivan |
| 2008/0270019 A1 | 10/2008 | Anderson |
| 2008/0270204 A1 | 10/2008 | Poykko |
| 2009/0030770 A1 | 1/2009 | Hersh |
| 2009/0049119 A1 | 2/2009 | Marcinkiewicz et al. |
| 2009/0083111 A1 | 3/2009 | Carr |
| 2009/0099971 A1 | 4/2009 | Salemme et al. |
| 2009/0125228 A1 | 5/2009 | Dicke |
| 2009/0177502 A1 | 7/2009 | Doinoff et al. |
| 2009/0216600 A1* | 8/2009 | Hill ....................... G06Q 30/02 705/7.14 |
| 2009/0222284 A1 | 9/2009 | McEachern |
| 2009/0254270 A1 | 10/2009 | Yu |
| 2009/0313077 A1 | 12/2009 | Wheeler |
| 2010/0017275 A1 | 1/2010 | Carlson |
| 2010/0076988 A1 | 3/2010 | Kenedy et al. |
| 2010/0243724 A1 | 9/2010 | Golla |
| 2011/0010300 A1 | 1/2011 | Audet |
| 2011/0060600 A1 | 3/2011 | Fox et al. |
| 2011/0099040 A1 | 4/2011 | Felt et al. |
| 2011/0137696 A1 | 6/2011 | Meyer et al. |
| 2011/0153495 A1 | 6/2011 | Dixon |
| 2012/0036082 A1 | 2/2012 | Cha |
| 2012/0130627 A1 | 5/2012 | Islam et al. |
| 2012/0179764 A1 | 7/2012 | Erdal |
| 2012/0253548 A1 | 10/2012 | Davidson |
| 2013/0030873 A1* | 1/2013 | Davidson ........... G06Q 10/1091 705/7.36 |
| 2013/0041720 A1 | 2/2013 | Spires |
| 2013/0245991 A1* | 9/2013 | Kriss ...................... G06Q 50/28 702/150 |
| 2014/0122147 A1* | 5/2014 | Christie ............. G06Q 10/0875 705/7.15 |
| 2014/0200804 A1 | 7/2014 | Wippler |
| 2014/0229399 A1* | 8/2014 | Ranganathan ....... G06Q 10/083 705/337 |
| 2014/0249742 A1 | 9/2014 | Krivacic |
| 2014/0330596 A1 | 11/2014 | Depura |
| 2015/0081162 A1 | 3/2015 | Mitchell |
| 2015/0088581 A1 | 3/2015 | Ikawa |
| 2015/0161696 A1 | 6/2015 | Jones |
| 2015/0379468 A1 | 12/2015 | Harvey |
| 2016/0012391 A1 | 1/2016 | Burnett |
| 2016/0047646 A1* | 2/2016 | Ochsendorf ......... G01C 21/343 348/148 |
| 2016/0071056 A1 | 3/2016 | Ellison |
| 2016/0202069 A1 | 7/2016 | Wippler |
| 2016/0273922 A1 | 9/2016 | Stefan |
| 2016/0300186 A1* | 10/2016 | Scharaswak ....... G06Q 10/0835 |
| 2016/0334236 A1 | 11/2016 | Mason |
| 2017/0046658 A1 | 2/2017 | Jones |
| 2017/0144671 A1 | 5/2017 | Memani |
| 2018/0025417 A1 | 1/2018 | Brathwaite |
| 2018/0211217 A1 | 7/2018 | Berdinis |
| 2018/0211218 A1 | 7/2018 | Berdinis |
| 2019/0095859 A1 | 3/2019 | Pike |
| 2019/0118825 A1 | 4/2019 | Madrigal |
| 2019/0122551 A1 | 4/2019 | Madrigal |
| 2019/0213529 A1 | 7/2019 | Donnelly |
| 2019/0232967 A1 | 8/2019 | Madrigal |

FOREIGN PATENT DOCUMENTS

| | | |
|---|---|---|
| CN | 103761635 | 4/2014 |
| CN | 103870893 | 6/2014 |
| CN | 105069594 | 11/2015 |
| EP | 2827289 | 1/2015 |
| JP | 2002-123887 | 4/2002 |
| JP | 2006-323784 | 11/2006 |
| JP | 2017-165509 | 9/2017 |
| KR | 1020170026805 | 3/2017 |
| NL | 2017377 | 3/2018 |
| WO | WO 2016/133594 | 8/2016 |
| WO | WO 2017/025955 | 2/2017 |
| WO | WO 2017/107854 | 6/2017 |
| WO | WO 2018/106730 | 6/2018 |
| WO | WO 2018/107046 | 6/2018 |
| WO | WO 2018/136179 | 7/2018 |

OTHER PUBLICATIONS

ISR and Written Opinion in PCT/US2019/036622 dated Sep. 23, 2019.
Examination Report for AU 2010325793, dated Jun. 21, 2013.
Search Report dated Oct. 1, 2013, for EP 10835261.8.

(56) References Cited

OTHER PUBLICATIONS

Alfred Round et al. "Future Ride: Adopting New Technologies to Paratransit in the United States", Working Paper, UCTC No. 306, University of California Transportation Center, 51 pges.
Shigemitsu et al. "AVM System", Fujistu Ten Technical Journal No. 33, 27:34, (2009).
EESR in EP 10835261.8 dated Oct. 10, 2016.
Examination Report No. 2 for AU 2015202596 dated May 22, 2017.
ISR and Written Opinion dated Jan. 25, 2019 in PCT/US2018/057538.
ISR and Written Opinion dated Apr. 24, 2019 in PCT/US2019/012516.
Written Opinion dated Oct. 11, 2019 in PCT/US2019/012516.
IPRP dated Aug. 4, 2020 in PCT/US2019/036622.
Hunt, J.B. Find a Load, Make an Offer with Carrier 360: Watch the Video , https://www.jbhunt.com/blog/2017/10/25/carrier-360-video Oct. 25, 2017.
Hunt, J.B., Carrier 360 Tutorial: Load Board Features [Video], https://www.jbhunt.com/blog/2018/03/01/360-load-board-features Mar. 1, 2018.
Hunt, J.B., Carrier 360 Tutorial: Creating Favorite Lanes [Video] https://jbhunt.com/blog/2018/04/13/carrier-360-favorite-lanes/ Apr. 13, 2018.
Hunt, J.B., Booking & Dispatching Loads https://www.jbhunt.com/blog/2018/05/22/carrier-360-dispatching-freight/ May 22, 2018.
Hunt, J.B., Simpler is Better: Easy check calls and automated detention, https://www.jbhunt.com/blog/2018/11/19/check-calls-detention-carrier-360 Nov. 19, 2018.
Hunt, J.B., Eight Things you can do using your J.B. hunt 360 account, https://www.jbhunt.com/blog/2017/06/13/jbhunt-360, Jun. 13, 2017.
Hunt, J.B., Get your next load recommendation from J.B. Hunt 360, https://www.jbhunt.com/blog/2017/08/02/360-load-recs/ Aug. 2, 2017.
Hunt, J.B., Loads Delivered to You: Three Ways to Find Loads Using Carrier 360 by J.B. Hunt, https://www.jbhunt.com/blog/2017/09/28/find-loads-carrier-360/ Sep. 28, 2017.
Hunt, J.B., Carrier 360 Introduces I'm Not Driving Mode, https://jbhunt.com/blog/2019/06/03/carrier-360-introduces-im-not-driving-mde/ Jun. 3, 2019.

\* cited by examiner

COORDINATING SHIPMENTS ON FREIGHT VEHICLES

BACKGROUND

Field

The present application relates to systems and methods for controlling freight vehicles and coordinating the shipment of freights.

Description of the Related Art

The traditional freight industry can be divided into shippers and carriers. Shippers want freight to be shipped and typically request that the shipment be made by contacting a carrier capable of carrying the shipment from a pickup location to a delivery location. Alternatively, shippers may contact a broker who can act as a middle-man between the shippers and carriers.

Brokers traditionally contact a variety of carriers to execute a shipment request. The carriers can be individual truck owners, or an entity that controls a fleet of vehicles. Operators of large fleets can often act like a broker, receiving requests from shippers and assigning those shipments to particular trucks in their fleet. However, a truck's availability can be difficult to predict due to variables including driver willingness, weather and traffic conditions, driving speed, driver fatigue, mechanical failures, regulatory requirements, refueling time (including recharging time for electric vehicles), delays at pickup and/or delivery, and other factors.

The various systems and methods described herein are usually described in the context of the trucking/freight industry. However, similar principles can be applied in other areas, and the breadth of this disclosure should not be limited to freight trucking.

SUMMARY

In one embodiment, a computer-implemented method for coordinating less-than-truckload shipments can be provided. Data corresponding to a new less-than-truckload shipment request can be received from a first computing device. The data can include a pickup location, a delivery location, a pickup time, and a delivery time. One or more trucks that are assigned to a current less-than-truckload shipment and are capable of executing the new less-than-truckload shipment while also completing the respective current less-than-truckload shipment can be identified from accessing a database. A message corresponding to an invitation for executing the new less-than-truckload shipment can be transmitted to one or more operator computing devices of the identified one or more trucks capable.

In another embodiment, a computer-implemented method of arranging shipments of freight by a carrier, can be provided, the method being performed by a computing system. A set of data each corresponding to a shipment request and each comprising a pickup location, a delivery location, a pickup time, and a delivery time for the respective shipment request can be received from a plurality of computing devices over one or more networks. A plurality of trucks available for executing the shipment requests, each truck being associated with data indicating availability for a specified duration of time and being associated with a starting location can be identified by accessing a database. The shipment requests can be assigned to the plurality of trucks such that each shipment is to be executed by a respective truck, and each truck returns to the respective starting location at the end of the specified duration of time. A set of control signals can be provided, over the one or more networks, to a carrier device associated with one or more of the plurality of trucks to control autonomous driving of the one or more of trucks to execute the respective assigned shipment requests.

In another embodiment, a non-transitory computer-readable medium can store instructions that, when executed by one or more processors of a computing system, cause the computing system to perform certain tasks. The computing system can be caused to receive, from a plurality of computing devices over one or more networks, a set of data each corresponding to a shipment request and each comprising a pickup location, a delivery location, a pickup time, and a delivery time for the respective shipment request. The computing system can be further caused to identify, by accessing a database, a plurality of trucks available for executing the shipment requests, each truck being associated with data indicating availability for a specified duration of time and being associated with a starting location. The computing system can be further caused to assign the shipment requests to the plurality of trucks such that each shipment is to be executed by a respective truck, and each truck returns to the respective starting location at the end of the specified duration of time. The computing system can be further caused to provide, over the one or more networks, a set of control signals to a carrier device associated with one or more of the plurality of trucks to control autonomous driving of the one or more of trucks to execute the respective assigned shipment requests.

BRIEF DESCRIPTION OF THE DRAWINGS

These and other features, aspects, and advantages of the systems and methods disclosed herein are described below with reference to the drawings of preferred embodiments, which are intended to illustrate and not to limit the inventions. Additionally, from figure to figure, the same reference numerals have been used to designate the same components of the illustrated embodiments. The following is a brief description of each of the drawings.

DETAILED DESCRIPTION

Improving predictions of delivery times and the availability to fulfill a shipment request for a specific time, place, size, weight, and other factors can drastically improve efficiency in the freight industry. Currently, large proportions (20%-30%) of trucking miles are "deadhead," meaning without cargo, because a shipment for the return trip could not be coordinated. Strict delivery times at depots require drivers to frequently waste hours waiting for their designated time to unload. Regulations on on-duty/off-duty time may require a driver to stop the vehicle and take an extended break just short of his destination. With improved predictability and control over the freight industry, many of these inefficiencies for carriers can be alleviated.

Shippers can also benefit from improvements in predictability. Just-in-time inventory management relies on predictable pickups and deliveries that are often missed due to unpredictable drive-time changes. Costs of shipping, in both fees and time spent contacting brokers and carriers, are significant. In the field of logistics predictability is critical.

Embodiments described herein relate to receiving and processing data to facilitate the shipment of freight. Freight can include a variety of things, including containers containing products, such as goods, bulk goods, refrigerated goods, goods carried in open containers, liquid goods carried in tanks, or other types of freight. However, it should be understood that similar systems and methods may be applied to the movement of other types of things not normally considered freight, such as live people or other things.

Further, embodiments described herein relate to receiving and processing data to facilitate the shipment of freight or other things using trucks. However, similar systems and methods could also be applied to other vehicles that move freight (or other things) such as airplanes, trains, ships, or other automobiles such as buses, vans, sedans, or other passenger vehicles.

Figure 1:
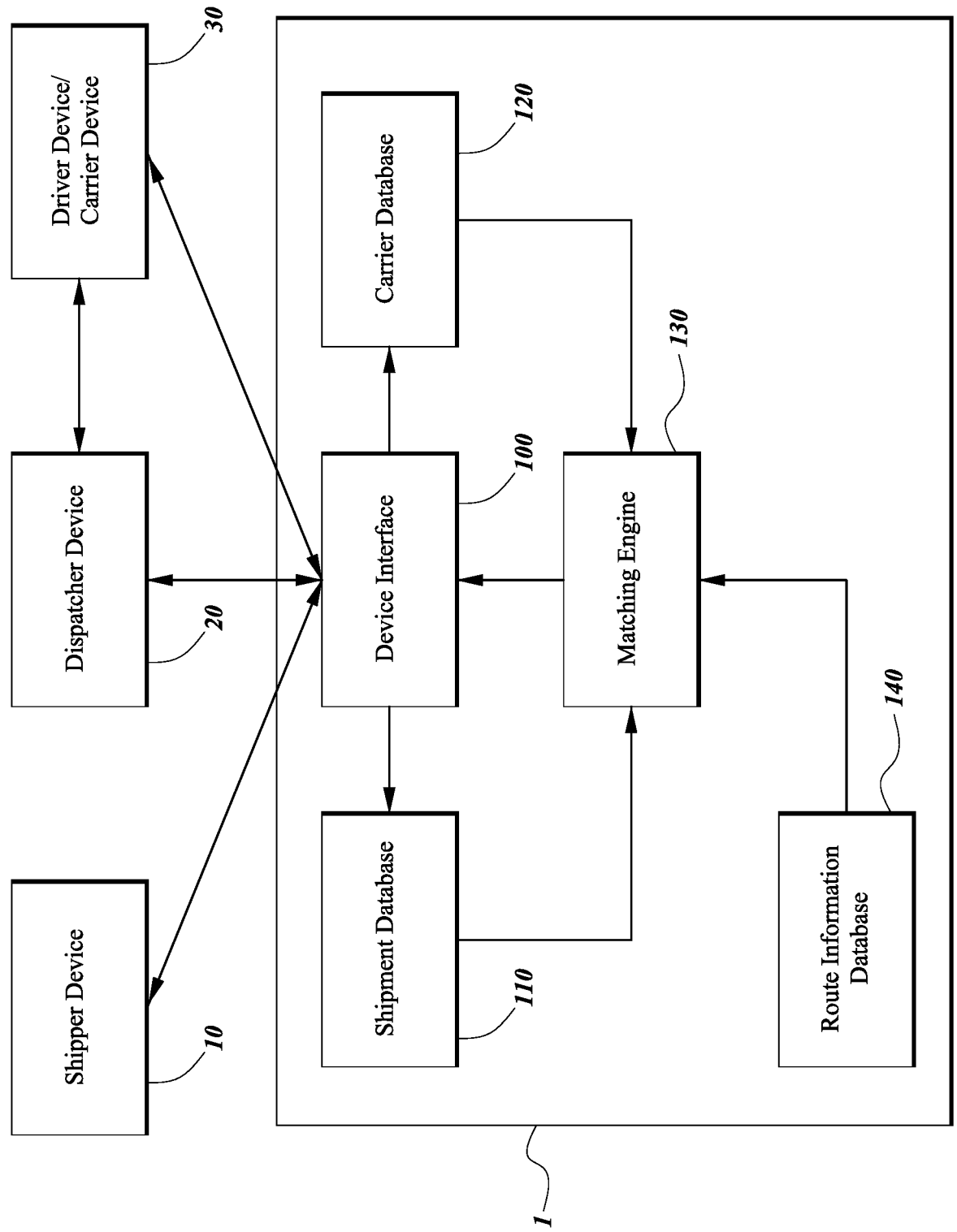
FIG. 1 is a block diagram illustrating components of an example system for coordinating the shipment of freight.

FIG. 1 is a block diagram illustrating components of an example system for coordinating the shipment of freight. As shown, the system 1 for coordinating the shipment of freight (e.g., shipment system 1) can communicate with shipper devices 10, dispatcher devices 20, and carrier/driver devices 30 through a device interface 100. The shipment system 1 can be implemented on a set of computing systems, such as one or more servers, using stored instructions executable by one or more processors of the set of computing systems. The device interface 100 can be a device or programmatic component configured for communication with other devices, such as an application programming interface (API) and/or devices for electronic communication including a router or server. Although only one device interface 100 is shown in the example of FIG. 1, in other examples, the shipment system 1 can include multiple device interfaces, such as a separate device interface 100 for communication with each of the shipper devices 10, dispatcher devices 20, and carrier/driver devices 30. As an addition or an alternative, the shipment system 1 can also include other components or have different components, as discussed further herein.

The shipper devices 10, dispatcher devices 20, and carrier/driver devices 30 can be a variety of different types of devices that facilitate communication between the users or operators of those devices, such as shippers, dispatchers, and carriers (such as drivers), respectively, with the shipment system 1. For example, the devices can include desktop computers, laptop computers, tablets, smartphones, terminals, processors, or other devices capable of communications, such as electronic communications with the device interface 100 over one or more networks, and performing independent computing tasks as described herein. Each can also include unique user interfaces embodied in software and/or hardware (such as a touchscreen, keyboard, microphone, display, and speaker) that facilitate user interaction with the shipment system 1 through the devices 10, 20, 30. With the user interfaces and other communications features, the devices 10, 20, 30 can output or transmit various types of information described herein to a user and/or to other devices, such as to the shipment system 1. Further, the devices 10, 20, 30 can receive data or information transmitted by the shipment system 1 (for example, through electronic transmission) or data inputted by a user through the user interfaces via an input mechanism. Through the shipment system 1 and the devices 10, 20, 30, communications can be made electronically, automatically, and immediately, such that shipments can be arranged, modified, and facilitated electronically, automatically, and immediately using software and techniques described herein.

Figure 2:
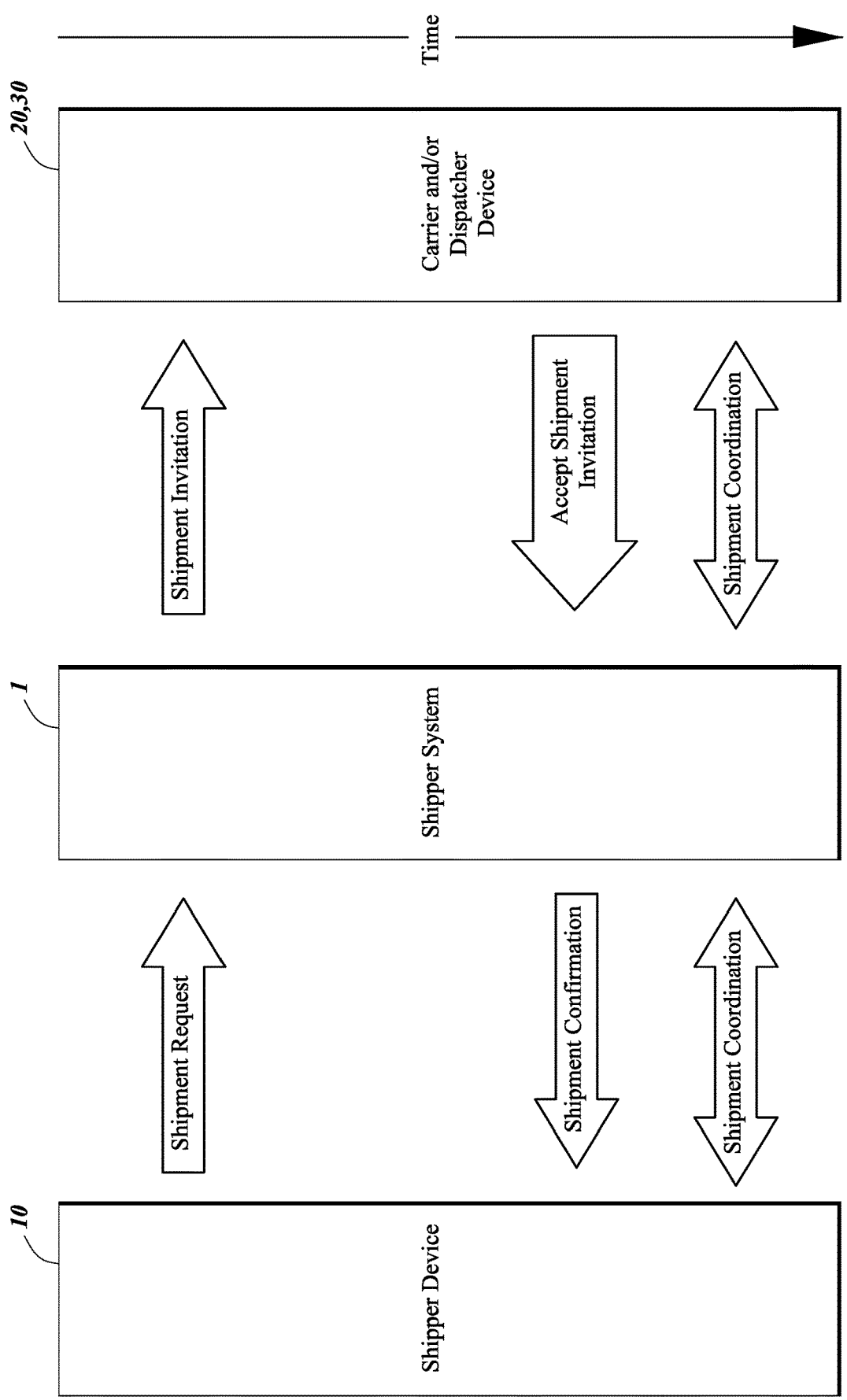
FIG. 2 depicts an example method for coordinating a shipment of freight.

The shipper devices 10 can be used by shippers to interact with the shipment system 1 and coordinate shipments for the shipper. As an example, a shipper device 10 can transmit, to the shipment system 1, data corresponding to a request for shipment (e.g., referred to herein as a shipment request), which can include information related to a shipment, such as a pickup location, a delivery location, and other characteristics or parameters, such as described with respect to FIG. 2. The shipment system 1 can receive the shipment request and communicate with dispatcher devices 20 and carrier/driver devices 30 to facilitate the execution of the shipper's shipment request. FIG. 2 illustrates this process, with time proceeding from the top of the figure toward the bottom. As shown, the shipment request is first transmitted from the shipper device 10 to the shipment system 1. The shipment system 1 can perform a matching process to determine which dispatcher or carrier should provide the shipment service based on a set of data. The shipment system 1 can transmit data corresponding to a shipment invitation to the matched dispatcher or carrier/driver devices 20, 30. Accordingly, in examples herein, the shipment system 1 can communicate with the shipper devices 10 to coordinate shipments by one or more carriers associated with the shipment system 1. Further, in some embodiments, the shipper devices 10 can include a transportation management system configured to communicate with carriers, such as Freight Management Solutions from McLeod Software or software provided by Mercury Gate.

The dispatcher devices 20 can be used by dispatchers to interact with the shipment system 1 and coordinate shipments by one or more carriers associated with the dispatcher. A dispatcher can be an entity that controls one or more carriers, such as an operator of a multi-truck fleet, although other types of dispatchers are also possible. The dispatcher may then determine if and when a particular carrier will execute a shipment request received from the shipment system 1. As an example, a dispatcher device 20 may receive, from the shipment system 1, information related to a shipment invitation. The dispatcher device 20 can transmit data indicating a willingness to execute or perform the shipment invitation, such as by transmitting an acceptance data packet to the shipment system 1.

The carrier/driver devices 30 can be used by carriers to interact with the shipment system 1 (and/or dispatcher devices 20) and coordinate shipments by the carrier. A carrier can refer to entities that physically execute a shipment (e.g., provide transport to move freight from one location to another). For example, a carrier can refer to a driver of a truck or an owner of the truck. Further, in the context of an autonomous vehicle, in one example, the carrier device 30 can be an integral part of the truck, embedded within the truck's computing system and operating system or as a component of the truck's computing system. In examples herein, the carrier/driver device 30 can correspond to a plurality of devices (e.g., a truck driver device, a truck owner device, an autonomous-truck-operating device, and/or other devices), which can be collectively referred to as "carrier" devices in the rest of this application. The carrier device 30 can optionally perform functions similar to the dispatcher devices 20, but for a single truck or driver. The carrier device 30 can also perform additional functions, such as reporting the current status of the truck (including its current location and condition using resources of the carrier device 30 or through communication with other devices coupled to the truck), receiving data corresponding to future shipments to be executed by the truck or driver, and/or controlling or driving the truck to execute the shipments. Additionally, in the context of a human on-board the truck (a driver or passenger), the carrier device 30 (such as a driver device) can also be used to allow the human to control various aspects of the truck, communicate with the shipment system 1, provide information to the human, and/or provide other features, through user interfaces on the carrier device 30 (e.g., via a dedicated application that communicates with shipment system 1 and/or a dispatcher device 20).

As illustrated in FIG. 2, the carrier/dispatcher device 20, 30 transmits data corresponding to an acceptance of the shipment invitation to the shipment system 1, which can provide data confirming that the shipment request has been processed and matched to the shipper device 10. Various communications can be provided between the devices 10, 20, 30 and the shipment system 1 to coordinate the shipment. However, in some embodiments, the carrier/dispatcher device 20, 30 can communicate with the shipper device 10, both to accept/confirm the shipment, and to coordinate the shipment. Even if this communication is enabled, the devices 10, 20, 30 can still communicate with the shipment system 1 to further facilitate execution of the shipment, payment for the shipment, quality control functions, or other functions.

Referring back to FIG. 1, through the device interface 100, the shipment system 1 can communicate with the shipper devices 10, dispatcher devices 20, and carrier devices 30 to coordinate shipments (for example, using the process shown in FIG. 2). Data received from the shipper devices 10, such as shipment requests, shipper preferences, or shipper contact and billing information, can be stored in a shipment database 110. Further, information received from dispatcher devices 20 and carrier devices 30 regarding carriers that may be available to execute shipments, their capabilities, or their availability/willingness to carry a shipment, can be stored in a carrier database 120. A matching engine 130 can receive information from the shipment database 110 (and/or the shipper device 10) and the carrier database 120 (and/or the carrier device 30) and identify one or more carriers that may be suitable for executing individual shipment requests. The suitability of a carrier to execute a particular shipment can depend on factors related to routes that could be taken to execute the shipment. Thus, a route information database 140 (and/or map database) can provide information to the matching engine 130 to facilitate the determination of suitable carriers. If a specific carrier is considered to be suitable for executing a shipment (e.g., based on a carrier state of availability or not, location of the carrier and/or truck, pickup and/or destination locations, etc.), information related to the shipment can be sent to an associated carrier device 30 or dispatcher device 20, as shown in FIG. 2 for example, as part of a shipment invitation. If the shipment is accepted, a message from the dispatcher or driver devices 20, 30 can be sent back to the shipment system 1, which can then confirm the shipment to the shipper device 10.

Variations to the system depicted in FIG. 1 are also possible. For example, in some embodiments, matching potential carriers with shipment requests can be executed on a dispatcher device 20 or a carrier device 30 instead of or in addition to the matching engine 130. In such an example, the dispatcher/carrier devices 20, 30 can receive all shipment requests, and suitable shipments can be filtered by a user, a comparable dispatcher/carrier matching engine, or some combination of the two. Similarly, shipment requests that are transmitted to a particular dispatcher/carrier device 20, 30 can be filtered by a matching engine 130 within the shipment system 1, and can then be further filtered by additional matching engines corresponding to the devices 20, 30. Further, the shipper devices 10 can indicate preferences for certain carriers (for example, carriers that are considered more reliable or familiar with a shipper's particular requirements). Similarly, data related to the shipments, carriers, road information, and other data can be stored on devices other than the shipment system 1 such as on a separate device attached to the shipment system through a data network.

Specific aspects of various portions of the systems and methods described above and illustrated in FIGS. 1 and 2 will now be described in further detail. Although these may occasionally be described in the context of the specific arrangements depicted in FIGS. 1 and 2, as described above, variations on the arrangements in FIGS. 1 and 2 can also be used.

Shipper Devices and Interfaces

As illustrated in FIGS. 1 and 2, the shipment system 1 can communicate with the shipper devices 10 to facilitate the shipment of freight. According to one example, a shipper device 10 can store and operate a designated application that communicates with the shipment system 1. Such a designated application can enable a shipper to receive or view information associated with the shipment system 1 and request a shipment by providing or configuring a set of shipment parameters via graphical user interfaces. As an addition or an alternative, the shipper device 10 can access a portal, such as via a browser application, that communicates with the shipment system 1. The shipment request can include information such as a date and a time (or window of time) and location to pickup and/or deliver the freight. Additionally, the shipment request can include more detailed information such as an identifier (ID) of the shipper or shipper device 10, the content of the freight, the weight and size of the freight, an estimated value of the freight, a required insurance for the freight, equipment required to guarantee the safety of the freight such as stabilizing straps, and other characteristics. Further, the shipment request can include other requirements for the shipment such as the need for a refrigerated container, auto transport, livestock car, dry bulk container, liquid tanker, and lowboy trailer. Further, the shipment request can indicate other unique characteristics of the shipment such as being an oversize load, the presence of hazardous materials, or special security concerns. Other information can also be provided, and all of this information can be used to determine particular trucks that may be appropriate to execute the shipment.

Further, the shipment request can indicate if a trailer should be provided by the carrier, or if it will be provided by the shipper. If the shipper provides or already has an appropriate trailer, this can also be indicated and the carrier truck can arrive without a trailer, or with a replacement trailer to leave with the shipper.

Although FIG. 2 illustrates one way in which a shipment system 1 can facilitate a shipment, other techniques are also possible. For example, in response to receiving a shipment request, the shipment system 1 can immediately determine a price to complete the shipment and transmit data corresponding to the price to the shipper device 10. In such an example, the shipment system 1 might not have a particular carrier that has agreed to execute the shipment, but could determine that sufficient carriers are available to ensure with reasonable probability that one of them would be willing to execute the shipment (e.g., such as by computing a likelihood score or probability that a carrier would execute the shipment).

According to an example, the matching engine 120 can determine that there are sufficient carriers available to ensure that one of them would be willing to execute the shipment by comparing the characteristics of the shipment request with known characteristics of a set of carriers (stored, for example, in the carrier database 120) to identify carriers capable of executing the shipment. The carrier characteristics can include permanent and semi-permanent characteristics of the carrier such as a type of truck or trailer, equipment available, fuel efficiency/speed profiles (for example, indicating the miles per gallon under various driving speeds and conditions), and mechanical status of various components on the truck/trailer. The carrier characteristics can also include non-permanent characteristics such as availability at various times and costs to use the truck and/or driver, and locations (current or scheduled future locations) of the trucks and/or drivers.

The availability of the truck and/or the driver can be determined from self-reported information, such as a driver indicating, via inputs provided on the carrier device 30 or other device, a period(s) of time that he or she is willing to drive and/or a truck owner indicating a period(s) of time the truck is to be available. The availability of the truck and/or the driver can also be determined from information detected automatically through the shipment system 1, such as a current location of the truck (for example, while executing a previously-planned shipment), an expected future location of the truck (based on non-autonomous human-driving or autonomous-driving, in addition to other factors), alternative possible future locations of the truck (such as if the truck's speed is increased to complete a previous shipment soon enough to execute the newly requested shipment), driver on-duty/off-duty time limits (based on regulations), and other factors. Such information can be provided to the shipment system 1 by the carrier/driver devices 30, for example.

The costs to use the truck and/or retain the services of the driver can also be determined from self-reported information, such as a requested fee for the driver's time and/or a requested fee for use of the truck, which can optionally be reported through the dispatcher devices 20 and/or the carrier/driver devices 30. Additional costs can relate to estimated costs for fuel (determined, for example, from an estimated fuel efficiency of the vehicle, and the route), estimated costs for wear-and-tear on the truck during the trip, estimated costs for food along the route, and estimated costs for insurance of the freight and truck. When these costs cannot be determined directly, they can be estimated using historical data, such as performance of given trucks on similar routes and fees previously accepted as sufficient for drivers' and trucks' time.

Figure 3:
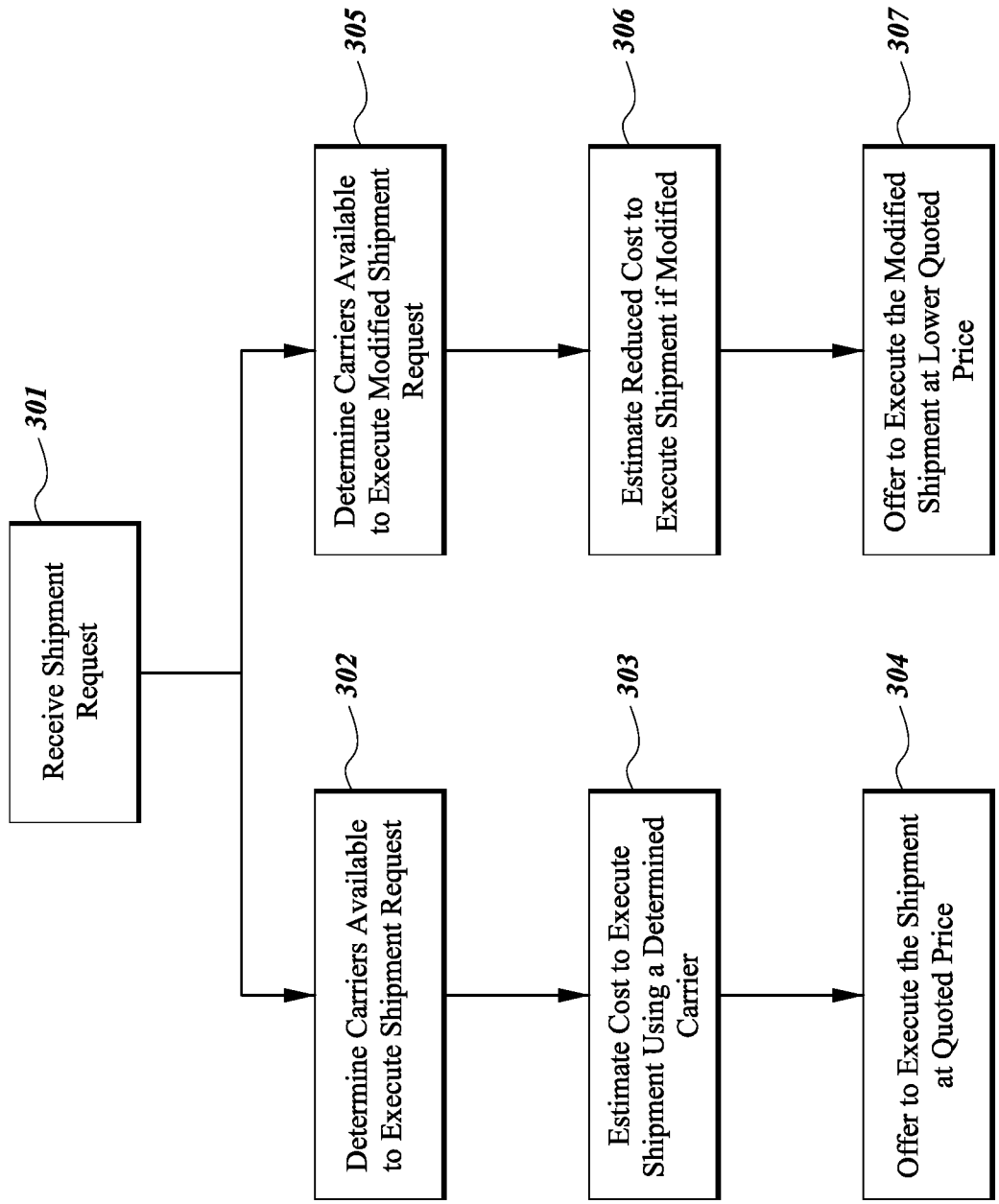
FIG. 3 depicts an example method for processing data for a request of a shipment.

FIG. 3 illustrates a process for facilitating shipments by immediately accepting a shipment request at a particular price, without knowing with certainty that a particular carrier will be able to execute the shipment, according to an embodiment. As illustrated in the example of FIG. 3, the shipment system 1 can receive a shipment request 301, and determine whether the shipment should be executed as requested, or determine whether a modification should be made to the shipment request. The shipment system 1 can make this determination based on the data or parameters in the shipment request and/or information about the characteristics of the carriers, trucks, and/or drivers. According to one example, a modification to the shipment request can reduce the cost to the requesting shipper. For example, a shipper may initially request that a shipment be executed at a time of low availability for carriers. Minor modifications, such as shifting a pickup time from the morning to the afternoon or to a different day (e.g., from Sunday to Monday) may reduce the cost of executing the shipment as a result of the increased number of potential carriers. Further, in another example, a shipment request can specify or include pickup times and/or delivery times that do not match or overlap with an expected time to drive between the pickup location and/or delivery location, such that the carrier needs to drive at inefficient speeds or waste time waiting to drop-off the shipment. The shipment system 1 can use estimated driving times (for example, based on autonomous driving or non-autonomous human driving), such as based on computed route(s), traffic conditions on such route(s), historical travel time along such route(s), etc., and the expected availability of various carriers to determine modifications that can decrease the cost of executing a shipment, for example using the matching engine 130. If the shipment system 1 determines that modifications do not need to be made to the shipment request, the shipment system 1 can process the shipment request as requested.

As illustrated in FIG. 3, for either of the original shipment request or the modified shipment request, the shipment system 1 can determine carriers available to execute the shipment 302, 305. This can be based on factors discussed herein, including, for example, carriers available at the times required and having the appropriate equipment or characteristics. The shipment system 1 can then estimate the cost based on the various costs discussed herein 303, 306. The shipment system 1 can offer to execute the shipment at a quoted price 304, 307. The quoted price can be the same as the estimated cost, or can be another price that may be adjusted for various factors, such as the risk to the shipment system's 1 operator that the estimated cost is incorrect, fees related to operating the shipment system 1, or other factors. By providing a quoted price immediately, the shipment system 1 can allow shippers to more quickly schedule their shipments. Further, by also suggesting a modified shipment at a lower quoted price immediately, the shipment system 1 can optimize the shipments based on both the carriers' and the shippers' preferences.

Similar methods can also be used to accept a price requested by the shipper. For example, if a shipper requests a shipment be executed at a specified price or price range, the shipment system 1 can automatically determine if the proposed price is sufficient and accept the offer by identifying carriers capable or likely to be capable of executing the shipment, using the matching engine 130 in ways similar to those discussed herein.

Once the shipment system 1 and the shipper have agreed to execute the shipment, the shipment system 1 can communicate with dispatchers and/or carriers to execute the shipment. Methods to perform this can be similar to that as illustrated in FIG. 2. Further details for determining an appropriate carrier are described further below.

Similar methods can also be used to coordinate or modify a shipment while it is being executed. For example, a shipper may decide that they would prefer that a shipment be delivered to a different location or at a different time, after the shipment has already commenced (e.g., after the shipment has been agreed upon, after the shipment has been picked up by the truck, etc.). Alternatively or additionally, due to various factors (unexpected traffic or weather conditions, mechanical failures, or other issues) the shipment could be expected to arrive at a time later than initially expected. If the delivery time is delayed, the shipment system 1 can optionally offer the shipper an ability to adjust the shipment such that it still arrives at the original delivery time for an adjusted price (for example, if the delay is not the fault of the shipment system 1).

Figure 4:
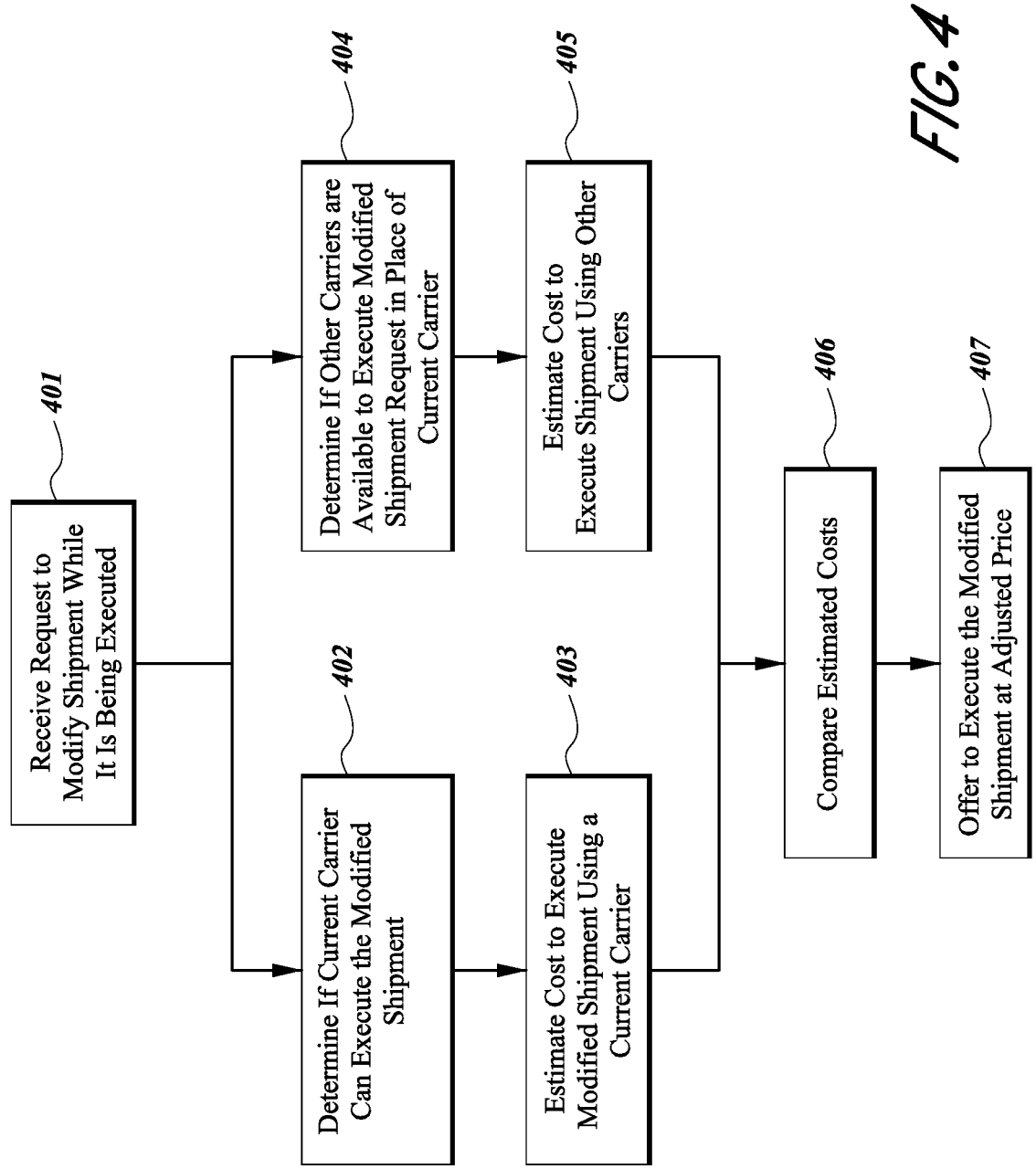
FIG. 4 depicts an example method for modifying a shipment.

As illustrated in an example of FIG. 4, the shipment system 1 can receive a request to modify a shipment while it is being executed 401. Alternatively, the shipment system 1 could anticipate that a shipper would like to modify a shipment (for example, if the delivery time is delayed, as discussed above). The shipment system 1 can then determine if the current carrier or other carriers can execute the modified shipment 402, 404, and estimate the cost for those carriers 403, 405. Costs could be related to changed fuel efficiency and driver/truck time, in addition to different trucks/drivers and other differences. The estimated costs can be compared 406, such that an optimal plan for shipment is determined (including, for example, pickup/delivery times, routes, driving speeds, refueling locations, etc.), and an adjusted price for the shipment can be offered to the shipper 407.

In similar embodiments, if the shipment system 1 determines that the shipper should not have to pay for modifications (such as if the shipment is delayed due to a problem with a carrier or with the shipment system itself) then a similar method can be used to adjust the shipment plan. For example, the method in FIG. 4 can be used, and the shipment can be adjusted, without the need to offer an adjusted price or receive a request to modify the shipment.

Dispatcher/Carrier Devices and Interfaces

Figure 5:
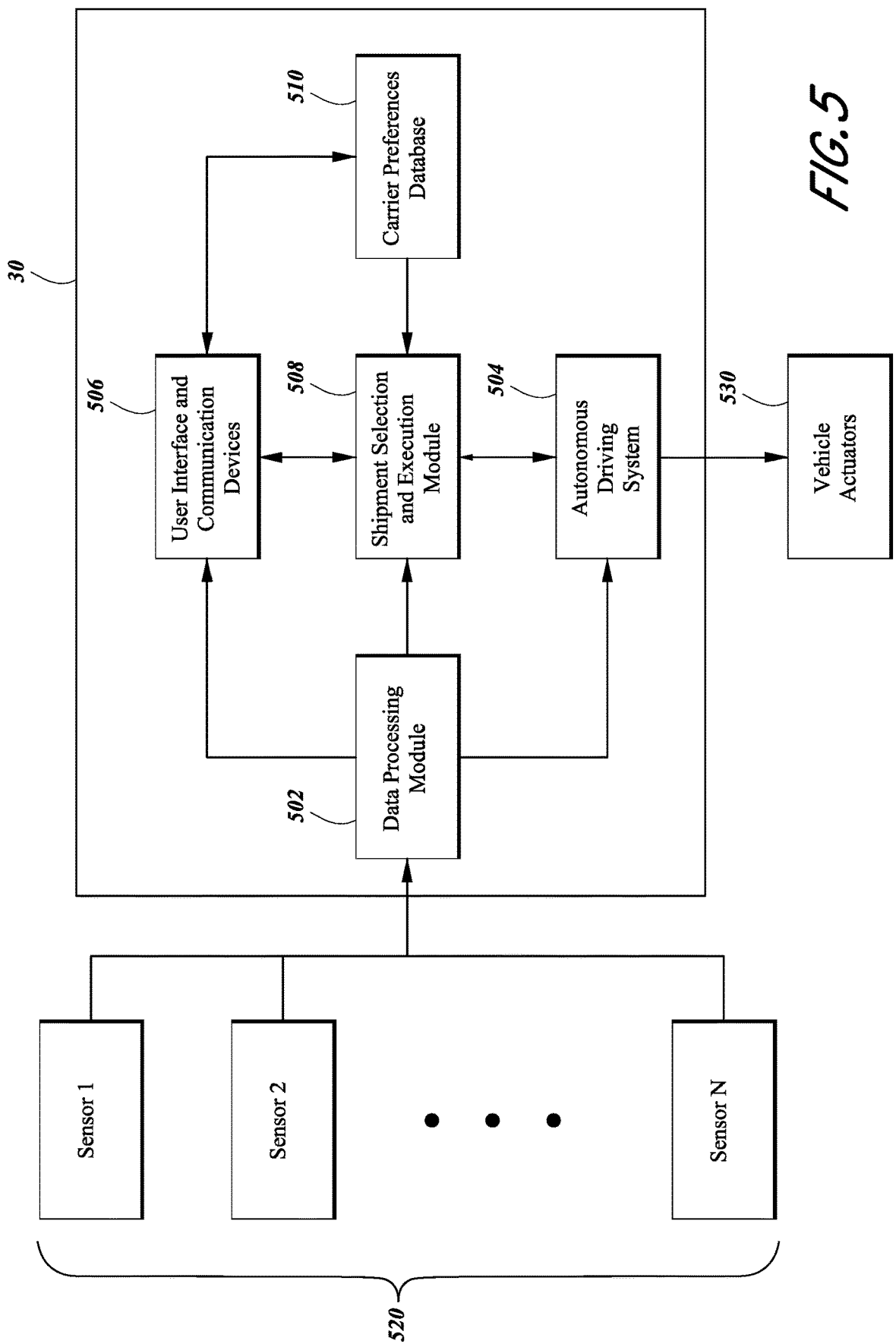
FIG. 5 is a block diagram illustrating components of an example carrier device.

FIG. 5 depicts a block diagram of components of an example carrier device 30, in the context of a carrier device that is integral with the vehicle or in communication with vehicle components. As an alternative, the carrier device 30 can receive data from another device coupled to the vehicle, such as a computing system of the vehicle or an electronic logging device (ELD), for example. As illustrated in the example of FIG. 5, the carrier device 30 can include a data processing module 502 that can receive data from a set of sensors 520 or other vehicle components associated with the vehicle, as discussed herein. The data processing module 502 can also optionally include or communicate with a memory component storing semi-permanent or permanent characteristics of the vehicle. According to one example, the data from the data processing module 502 can be used by an autonomous driving system 504 to control the vehicle using vehicle actuators 530. In other embodiments, the carrier device 30 can lack an autonomous driving system, such as when the vehicle is non-autonomous or uses other components to provide autonomous functionality. The data processing module 502 can also provide data to user interfaces and communication devices 506 associated with the carrier device 30, which can convey this information to a user of the device or external devices such as the shipment system 1 (and the device interface 100) over a mobile network using a transceiver, for example. The data processing module 502 can also provide data to a shipment selection and execution module 508, which can facilitate the acceptance or rejection of shipment invitations and/or perform high-level driving control (for example, through the autonomous driving system 504), such as determining when to refuel and/or what routes to travel. The decisions to accept/reject shipment invitations and determine/adjust routes can be influenced by a carrier preferences database 510, which can store carrier preferences such as a desired payment to execute a shipment, preferred truck stops, and other features. These preferences can be populated from inputs received through the user interface 506.

Variations are also possible. For example, in some embodiments, the carrier device 30 can be divided into multiple devices that can each include some or all of the components depicted in FIG. 5. These devices can then communicate with each other to provide comparable functionality over wired or wireless connections. Similarly, the dispatcher devices 20 can have similar characteristics, but be remote from the vehicle and thus not include or communicate with the sensors 520, the autonomous driving system 504, or the vehicle actuators 530.

As shown in FIGS. 1 and 2, the shipment system 1 can communicate with the carrier/dispatcher devices 20, 30 to facilitate the shipment of freight. As discussed with respect to FIG. 2, at an initial stage, the carrier/dispatcher devices 20, 30 can be used to agree or refuse to execute a shipment invitation. For example, in some embodiments, an application or other software installed on the carrier/dispatcher devices 20, 30 can receive a message (for example, through the communication devices 506) describing the shipment request and asking for an agreement to execute the request, and similarly to transmit a message back accepting or refusing the invitation.

Similarly, in some examples, the carrier/dispatcher devices 20, 30 can be used to indicate certain situations (e.g., when one or more particular parameters or conditions are satisfied) in which it will automatically accept a shipment invitation. Parameters defining acceptable shipment invitations can be stored in the carrier preferences database 510 and can include a timeframe during which a truck/driver can be on-the-road, a time when the truck/driver will reach an end location (such as when the truck/driver desires to return home or otherwise go off-duty), times when the driver may wish to sleep/rest (such as during autonomous driving of the truck), a desired price for executing the shipment (such as a price for the driver's time and for use of the truck or other equipment), and/or other factors that can determine availability. This information can be inputted by a carrier or dispatcher through the user interfaces 506 associated with the carrier/dispatcher devices 20, 30, and either transmitted to the matching engine 130 in the shipment system 1 or used by the shipment selection and execution module 508 to determine matching shipments. The shipment request can then be automatically assigned to a carrier with matching parameters, without requiring an explicit acceptance, such that the carrier can essentially be commanded to execute the shipment by the shipment system 1. This system can be particularly helpful for arranging shipments quickly with carriers already on-the-road executing preceding shipments, such that they have a subsequent shipment already assigned to them beginning as soon as possible after they deliver the preceding shipment.

Further variations are also possible. For example, the carrier/dispatcher devices 20, 30 could indicate certain necessary parameters, but also provide an option for the carrier or dispatcher to refuse shipments having criteria that meet those parameters. Thus, the shipments offered to them can be filtered (either in the shipment system 1 or on the devices 20, 30), facilitating review and acceptance of appropriate shipments. As an addition or an alternative, shipments meeting the parameters could be automatically accepted, but the carrier/dispatcher devices 20, 30 could also receive the option to accept other shipments that do not meet the parameters. Thus, for example, a driver can indicate their requirements during normal working times, but also maintain the possibility to work at unusual times for a higher fee.

In some examples, the carrier/driver devices 20, 30 can interact with components on the truck (or other vehicles) or communicate with a computing system of the truck that interacts with the components. For example, the truck can generate and store data (for example, stored in the data processing module 502 or other memory resource), such as its make, model, and year, and other static data, and can include a variety of sensors 520 generating data about the vehicle, such as data related to components on the vehicle (brakes, lights, battery, and other components) and their status, fluid levels (fuel, oil, transmission fluid, brake fluid, and others), and/or other characteristics of the vehicle. The sensors 520 can also detect characteristics related to the truck's environment, such as the temperature, time of day, weather conditions (rain, snow, amount of sunlight, fog), its location (for example, using the Global Positioning System, "GPS," receiver of the driver device 30 or the GPS receiver of the computing system of the truck), its orientation (for example, using a compass or position information or velocity determined from GPS data), and/or nearby objects (such as other automobiles, pedestrians, bicyclists, and stationary objects, using LiDAR sensors, cameras, and other sensors). The sensors 520 can also detect characteristics of the motion of the truck such as its velocity, the orientation of the wheels, the activation of the brakes, engine revolutions, and the gear in use. Even further, the sensors 520 can detect a status of one or more humans inside the truck such as to detect if a person is in the driver's seat or the passenger seat, if a person's hands are on the wheel or feet are near the pedals, or if a person is in the sleeper berth.

According to some examples, the truck (and its sensors 520) can communicate with the carrier/dispatcher devices 20, 30 (and their data processing modules 502), either directly or indirectly. For example, the sensors 520 could communicate directly with a carrier device 30 that is integrated with the truck over a wired or wireless connection. Wired or wireless connections can also be used with other carrier devices 30 such as mobile phones, tablets, and laptops or remotely-located computing devices. Indirect communications can also be used to communicate with carrier/dispatcher devices 20, 30. For example, a remotely-located dispatcher device 20 may receive data through a carrier device 30 located on the vehicle. Thus, a dispatcher device 20 may be located at a stationary office building and communicate over a network with a carrier device 30 located on a truck. A driver device located inside the truck can also communicate with a carrier device integrated with the truck in a similar manner. The sensors 520 can also be part of the carrier device 30, such as a GPS sensor on a mobile phone driver device.

Data from the sensors 520 can be used by the matching engine 130 and/or the shipment selection and execution module 508 to determine the availability of a truck/driver to execute a shipment. For example, the sensors 520 can indicate if a location of the truck/driver is within range to arrive at the requested pickup location at the requested pickup time, or at the requested delivery location at the requested delivery time. In one example, referring to FIG. 1, the data from the sensors 520 can be provided to the shipping system 1 for storage in the carrier database 120 (e.g., periodically or in response to triggered events, such as user input or state change, or based on a schedule).

Similarly, the data can be used to determine if the truck/driver is likely to complete a prior shipment at a specified or predetermined time before a subsequent shipment so that the truck/driver is able to execute a subsequent shipment (e.g., the specified or predetermined time can be based on a time to travel from a delivery location of the prior shipment to the pickup location of the subsequent shipment, a time to load and/or unload, and/or a time to refuel, etc.). In addition to determining when the prior shipment will be completed, the data can indicate if the truck will need to take time to refuel or receive maintenance, if the driver will need to take time off-duty, or if other delays might be necessary between shipments or during a subsequent shipment.

Data from the carrier devices 30 can also be used to estimate detention time. For example, GPS sensors of the driver device or a vehicle can indicate when the vehicle is at the pickup location or delivery location. The shipper can optionally be charged for the amount of time the vehicle is held at the pickup location or delivery location for loading and unloading. For example, the shipper can be charged for the total time, or be charged a fee for time over a predetermined amount of time. The amount of time the vehicle is detained at the pickup and delivery locations can be determined by monitoring the location of the vehicle using GPS sensors and/or based on the timestamps of the GPS data. Alternatively, sensors can also detect other characteristics of the vehicle, such as engine activity, to determine how long the vehicle is detained.

The dispatcher/carrier devices 20, 30 can also provide additional data to users (such as a driver or owner of the truck), through the user interfaces 506, that can be used to help determine if a shipment request should be accepted. For example, a suggested route can be provided with the shipment request so that the user of the device can see where the truck is likely to travel while executing the shipment. If certain roads are known to have poor characteristics (for example, road surface quality, autonomous driving availability, fuel prices, and food options), then the route/shipment can be rejected. In one example, the system can also indicate alternative route options to complete the shipment that could be more attractive to the user. For example, the system may indicate one, two, three, or more than three routes in order of expected attractiveness to the user based on criteria, such as driving time, autonomous driving time, distance traveled, expected fuel costs, expected vehicle wear-and-tear, and food options. Depending on implementation, such suggestions can be influenced by the carrier preferences database 510, and generated by the shipment selection and execution module 508, or they can be provided by the shipment system 1 using similar techniques with the matching engine 130 and the carrier database 120.

Still further, these components could provide a more complete plan for executing the shipment, such as with a suggested itinerary for the route including expected times and locations for events such as eating, refueling, going on-duty, going off-duty, and using autonomous driving. Thus, the itinerary can indicate times when the driver will be able to eat, rest, or sleep. Further, the itinerary can estimate fuel costs based on known fuel prices at a location where refueling is planned, and food costs based on known prices at restaurants where eating is planned. Such costs can also be estimated with just a route, but using a more-detailed itinerary (with expected times) can provide a more accurate estimate. Various options for the itineraries can be provided in a similar manner to the routes.

Further, using responses from the carrier, route/itinerary preferences of the carrier can be determined and used to suggest more appropriate routes/itineraries in the future. For example, if a carrier prefers to eat at certain types of restaurants (based on food style, food brand, price level, or other criteria) then the suggested routes and itineraries can be determined to be more preferable, even if the costs of the trip (in fuel, wear-and-tear, and food prices) or the time of the trip may be higher. Such preferences can be stored in the carrier preferences database 510, or similarly stored in the carrier database 120, to provide route/itineraries optimized for costs and carrier preferences in the future.

One method of comparing the different route/itinerary options can include initially determining an expected cost of the trip, and then adjusting that cost based on carrier-preferences for non-monetary characteristics. For example, if a carrier chooses a route that is a certain amount more costly than another route but includes a particular type of restaurant, then future routes including that type of restaurant can be judged as less-costly. Other techniques, such as machine-learning techniques, can also be used to learn a carrier's preferences for various characteristics of the routes and itineraries.

Notably, the systems described above for determining if a driver/truck is available to execute a shipment and facilitating a carrier's decision to accept a shipment can be used in more complex situations. For example, the systems can also be used to arrange subsequent shipments that occur immediately after a proceeding shipment. The shipment system 1 can use expected driving times (based on human driving or autonomous driving) to determine if a subsequent shipment can be executed by the vehicle, reducing down-time or deadhead driving.

Additionally, when one or more shipments are available, the shipment system 1 can present a set of shipments to a carrier/dispatcher as a shipment group. The shipment group can be strung together with each component shipment in the group occurring immediately after the preceding shipment. Thus, downtime between each shipment can be reduced to a minimal amount of time that is still sufficient to allow for variations in driving times, loading/unloading times, refueling, eating, and other issues. The shipment groups can further be arranged such that a truck and driver return home during the last delivery of the shipment group, yielding minimal deadhead driving. In some embodiments, two, three, four, or more than four shipments can be combined in this manner and provided to the carrier at the same time.

The shipment groups can also include relay systems, in which a first carrier brings the shipment a first portion of a shipment's distance, and then a second carrier picks-up the shipment and brings it a second portion of the shipment's distance. This process can repeat as many times as desired to execute the shipment. The relay system can facilitate reduction of shipment times by allowing the shipment to keep moving without stopping to refuel, eat, or take off-duty-time. Further, if the relay system runs in both directions along a specific route, then deadhead driving can be avoided. Still further, the relay system can facilitate allowing a carrier to return to their starting point at an end of the day without deadhead driving. In some relay systems, a truck might not travel more than a predefined distance and/or time, such as 150 miles from its starting point, while the carried shipment travels further.

Notably, in the context of a shipment group, a carrier may be willing to accept a shipment at a lower price, knowing that multiple shipments can be combined without deadhead driving or downtime. Thus, the shipment system 1 can allow a carrier to indicate their desired earnings to be lower on a per-mile or per-hour basis (time and/or distance basis) if subsequent shipments can also be scheduled. Alternatively, the carrier can indicate a desired earnings per-day to account for potential downtime or deadhead driving.

In some examples, such as in the event that acceptable shipments (as determined by the carrier) are not available for the carrier or driver, the carrier devices 30 can also indicate to a user a cost to return home. For example, if the carrier is a certain distance away from home the device can indicate the fuel costs to return home and an expected time of arrival. Further, the shipment system 1 can use historical data to provide the carrier with an indication of the likelihood that a new shipment will become available within a specified duration of time. Thus, the carrier can make an educated decision on whether to return home or wait in their current location for a shipment.

The carrier devices 30 can also provide functionality specific to use while driving. For example, in the context of an autonomous vehicle, the device 30 can indicate when autonomous driving needs to be terminated. Autonomous driving may need to be terminated in the case of unsafe conditions (for example, weather conditions, road conditions, and traffic conditions), regulations against autonomous driving, the need to stop to refuel or deliver a shipment, a mechanical failure, on command from a police vehicle, or other situations. These can be determined by the shipment selection and execution module 508, such as by using data from the sensors 520 described herein and other data such as data related to weather, road conditions, and regulations that can be received from other data sources, such as a data network through the communication devices 506.

Figure 6:
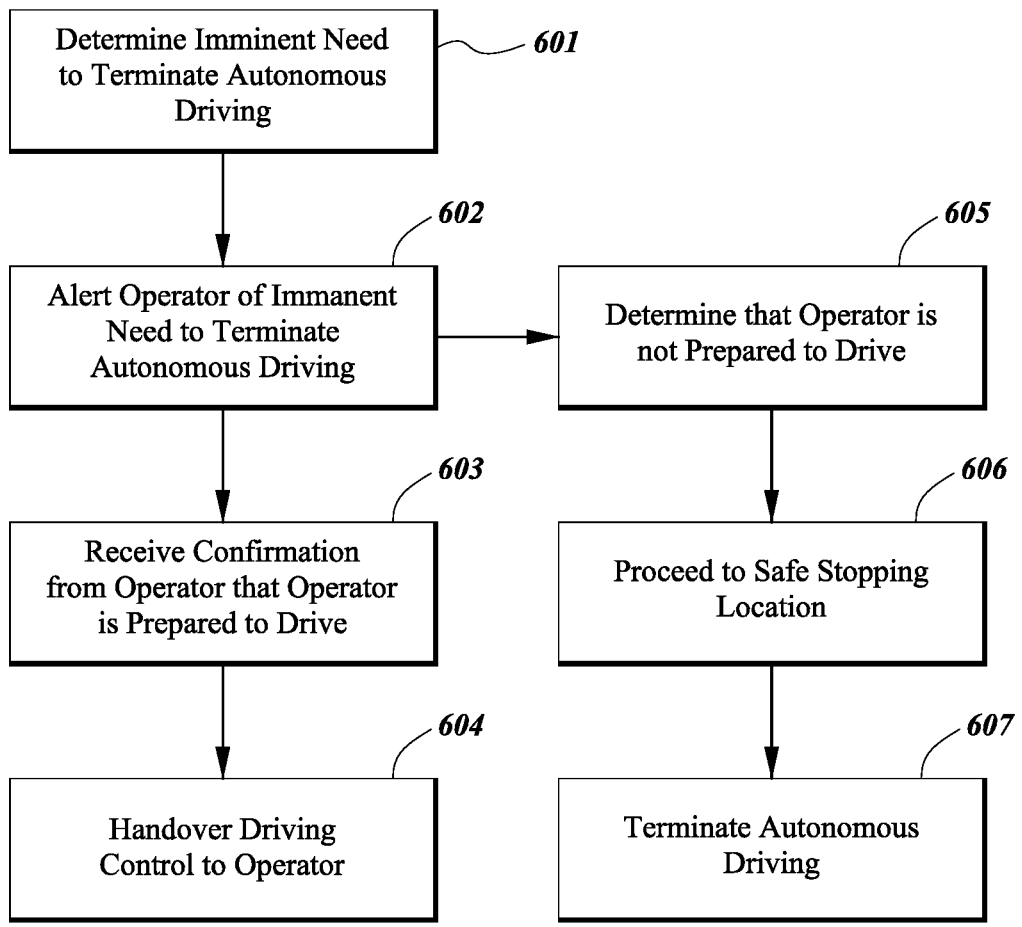
FIG. 6 depicts an example method for terminating autonomous driving.

FIG. 6 depicts a method for indicating when autonomous driving needs to be terminated and terminating autonomous driving, according to an embodiment. As illustrated in FIG. 6, once an imminent need to terminate autonomous driving is determined 601, the computing system of the vehicle (and/or the carrier/driver device) can provide an alert to an operator of the vehicle 602. The operator can be a human inside the vehicle (e.g., the carrier/driver). According to one example, the alert can be provided in advance, such as, for example, at least five minutes or one minute before autonomous driving needs to be terminated. The alert can also be provided immediately, such as when the need to terminate autonomous driving was unexpected or unplanned (e.g., as a result of an occurrence in the environment or external to the vehicle).

The alert can be provided as a visual signal, an audio signal, a haptic signal, and/or another signal. For example, the alert can be provided using a light on the dashboard of the vehicle, by activating lights in the sleeper berth, or by providing an alert on a screen integral with the truck or on a separate carrier device. The alert can also be provided using speakers integral with the truck or on a separate carrier device. Haptic signals can also be provided through vibrating features in the seats or the sleeper berth of the vehicle or on a separate carrier device such as a user's mobile phone, smartwatch, or other wearable devices. Other signals can be provided using the motion of the vehicle itself, such as by providing a small but sudden swerve, brake, or acceleration of the vehicle that can be felt by a human but is unlikely to interfere with nearby traffic or affect safety. In the context of a fully-autonomous vehicle, such alerts may be necessary to awaken an operator who has fallen asleep. Thus, the strength of the alerts can optionally strengthen as the need to terminate autonomous driving becomes more imminent.

The operator can confirm receipt of the signal and the operator's preparedness to drive the vehicle 603 in a variety of ways. The operator can press a button or user interface feature on a display of the computing system of the vehicle or speak into a microphone of the computing system, for example, to confirm his or her preparedness to take control over driving. The shipment selection and execution module 508 can also use one or more sensors to confirm that the operator is in the driver's seat, has hands on the wheel, and/or has a foot on a pedal. Once the preparedness is confirmed, the shipment selection and execution module 508 can terminate the autonomous driving mode and the operator can begin driving the vehicle 604.

If it is determined that the operator is not prepared to drive 605 (for example, if no response to the alert is provided or based on the unprepared position of the operator determined from sensor data) then the vehicle can autonomously determine a safe stopping location, proceed to the safe stopping location 606, and terminate autonomous driving 607 once the vehicle is at the safe stopping location. For example, if a road shoulder is available, the vehicle can determine, based on sensor data, the road shoulder characteristics (e.g., that the road shoulder is within a predefined distance from the vehicle's current location and/or is wide enough for the vehicle to stop at such that it would not impede the roadway, etc.), determine that the road shoulder is a safe stopping location, and control the vehicle to proceed to the road shoulder and stop. Other stopping locations may also be appropriate. If no known and safe stopping location is nearby, the autonomous driving system 504 or the shipment selection and execution module 508 can access map data indicating nearby stopping locations (stored locally or accessed through the communication devices 506), and reroute to those locations. The carrier device 30 can also optionally take other safety precautions such as activating hazard lights and initiating contact with local authorities (police and medical) over a cellular or data network. In some embodiments, during unsafe conditions such as when the operator on-board is unavailable and it is determined that it would be inappropriate to use the autonomous driving capability to bring the vehicle to a stop, the vehicle can be controlled remotely to proceed to an appropriate location through the communication devices 506. Further, the autonomous driving system 504 can optionally avoid the need to end autonomous driving by rerouting the vehicle to an area where autonomous driving does not need to be terminated.

The carrier devices 30 can also facilitate recording the activities of a human operator of a truck during a shipment, including shipment-related activities before or after picking up and/or delivering the shipment, such as preparing for and driving to/from the pickup/delivery locations. Recording the activities of the human operator can be used for determining wages dependent on working hours, indicate an operator's fitness to operate the vehicle (for example, indicating if the operator is likely tired due to excessive hours on-duty), and show compliance with on-duty time limits under various regulations. The system can use inputs from the operator through the user interfaces 506 on the carrier device 30 to indicate and store data about the time it takes to perform various individual tasks, such as filling-out paperwork, loading/unloading freight, refueling the vehicle, undergoing weigh-station inspections, driving, or monitoring autonomous driving. These activities can also at least partially be measured by the carrier device 30 in the examples in which the device is used to facilitate these functions or includes other sensors 520 that can indicate an activity of the operator.

Additionally, the shipment system 1 and/or the carrier device 30 can use data collected from the vehicle's sensors 520 to independently indicate certain activities of the operator. For example, in the context of an autonomous vehicle, the device 30 can record the amount of time that the autonomous vehicle drives itself (fully-autonomous). Similarly, the device 30 can record the amount of time that the autonomous vehicle is driven in a semi-autonomous mode, such as with the operator actively monitoring the vehicle or when the operator is providing some other reduced influence on the driving of the vehicle. Further, the device 30 can record the amount of time that the operator drives the vehicle in a non-autonomous mode. For example, the device 30 can store timestamps when certain events occur, e.g., when the mode changes from non-autonomous mode to autonomous mode, and vice versa, along with the location information when such events occur, and determine a duration of time when the vehicle operates in a particular mode.

The device 30 can also record times where the driver is off-duty (e.g., when the driver is not capable of driving or has indicated a state of unavailability). For example, one or more sensors 520 on the truck can detect when the operator is in a sleeper berth of the truck, and determine that the driver is off-duty. In another example, motion sensors and/or pressure sensors can be used to determine the operator's specific location and movement within the truck, such that a period of sleep can be indicated and recorded. In such an example, if an operator is determined to have received insufficient off-duty time or sleep, this can be indicated to the operator and the device 30 can be configured to prevent non-autonomous driving of the vehicle until sufficient off-duty time has been taken or another operator is available.

In one example, the recorded data, such as the times of on-duty and/or off-duty, can be transmitted by the device 30 or other elements in the system to third parties, such as regulatory or law enforcement personnel systems to confirm that certain requirements for time spent on-duty have not been violated. The transmission can be performed automatically, upon request, upon reaching a checkpoint such as a weigh station, and/or at other times. Additionally or alternatively, as discussed further herein, the shipment system 1 can use these times to determine what arrival times are possible while staying in compliance with one or more rules, such as limits on an operator's amount of time spent on-duty, and adjust various driving plans accordingly.

For example, the device 30 can determine that an operator has been driving or otherwise on-duty for an amount of time nearing a limit and will need to stop for a break prior to reaching a delivery location or other destination. The device 30 can indicate the time until the limit is reached and suggest places to stop such as a preferred restaurant, hotel, rest stop, or other stopping location. The device 30 can also transmit information about the amount of time the operator has been driving and/or the time when the operator will be off-duty to the shipment system 1 and/or other systems or devices, such as the dispatcher device 2

Matching Engine

As depicted in the example of FIG. 1, the shipment system 1 can include a matching engine 130 that can determine carriers (trucks and/or drivers) suitable to execute a shipment request. FIG. 2 depicts an example method for determining a carrier to execute a shipment request. In another example, the shipment system 1 may also determine who receives the option to accept the shipment request first. Alternatively, the shipment system 1 can provide the option to multiple carriers and then determine a preferred carrier from those that accept. For example, the carriers may provide a price to execute the shipment with their acceptance, and the system 1 can assign the shipment to the lowest priced carrier/dispatcher.

Figure 7:
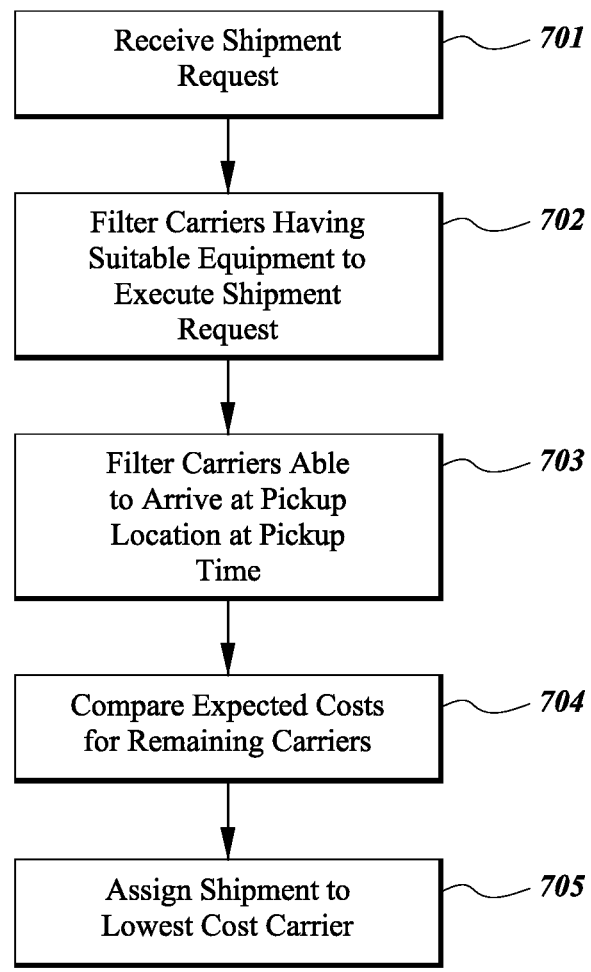
FIG. 7 depicts an example method for assigning a shipment to a carrier.

An example method for assigning a shipment request using the matching engine 130 is depicted in FIG. 7. As illustrated in FIG. 7, the shipment system 1 can receive, over one or more networks, a shipment request from a shipper device 701. The shipment request can include data about the shipment, including an identifier of the shipper and/or shipper device 10, the freight or shipment information (e.g., type, size, weight, etc.), location information for the shipment, shipment pickup and/or destination date and/or time information, required equipment or truck size data, the entity or person to ship the shipment to, and/or other data. The matching engine 130 can access the carrier database 120 to identify one or more carriers capable of executing the shipment request based on carrier information and data from the shipment request. For example, the matching engine 130 can filter for carriers having suitable equipment to execute the shipment request 702. The matching engine 130 can also filter for carriers able to arrive at the pickup location for the shipment request at the shipment time 703 (based, for example, on the carrier's current position and shipments currently being executed). While the example of FIG. 7 depicts two steps 702, 703 for filtering carriers, in other examples, the steps can be performed concurrently or can be performed in different order (e.g., filter based on location and time before filtering based on equipment, etc.). Still further, depending on implementation, the matching engine 130 can also filter for carriers based on other data, such as price, carrier-specific restrictions, etc. The matching engine 130 can compare costs between various carriers capable of executing the shipment 704, and assign the shipment to the lowest cost carrier 705 (e.g., transmit a shipment invitation to the respective device 30 of the selected carrier).

According to some examples, suitable carriers can be filtered-for based on their current location, already-accepted shipments, identified suitable equipment, driver availability, quality ratings reported from previous shippers, and other factors. These features can be combined with those depicted in FIG. 2. For example, the shipment request can only be transmitted to carriers/dispatchers who are suitable to execute the shipment based on the criteria, or all requests can be transmitted but only suitable shipments can be displayed by the carrier/dispatcher devices 20, 30 to a user (for example, by using a comparable matching engine on the carrier/dispatcher devices 20, 30). The carrier(s) responding with a willingness to execute the shipment can then serve as an additional filter, similar to those depicted in FIG. 7.

As noted above, cost can be used as a factor to determine which carriers are given priority for a shipment request (such as by receiving the offer first or being assigned the shipment over other willing carriers). These can be based on the expected cost to execute the shipment (including costs for an operator's time, use of the truck, fuel, wear-and-tear on the truck, insurance, and/or road tolls), which can be a combination of costs that are specific to the truck, operator, and/or the route. However, other costs can be considered that involve the operator, truck, and shipment's relationship to other shipments in the system.

For example, the shipment system 1 can review other shipments scheduled and assign them, together, to a carrier such that the truck can return to a desired off-duty location (for example, near the home of the operator) at a desired off-duty time (for example, at the end of a working day or the start of the weekend). Similarly, the shipment system 1 can recognize that an operator desires a specific off-duty location/time and preferentially assign a shipment to that operator such that they can go off-duty as desired. The off-duty time preferences can be submitted to the shipment system 1 using the carrier device 30, for example, via user input that specify carrier preferences. Carriers without a desired off-duty time or with excess driving-time available prior to a desired off-duty time can be assigned other shipments that do not necessarily bring them to a specific location.

Figure 8:
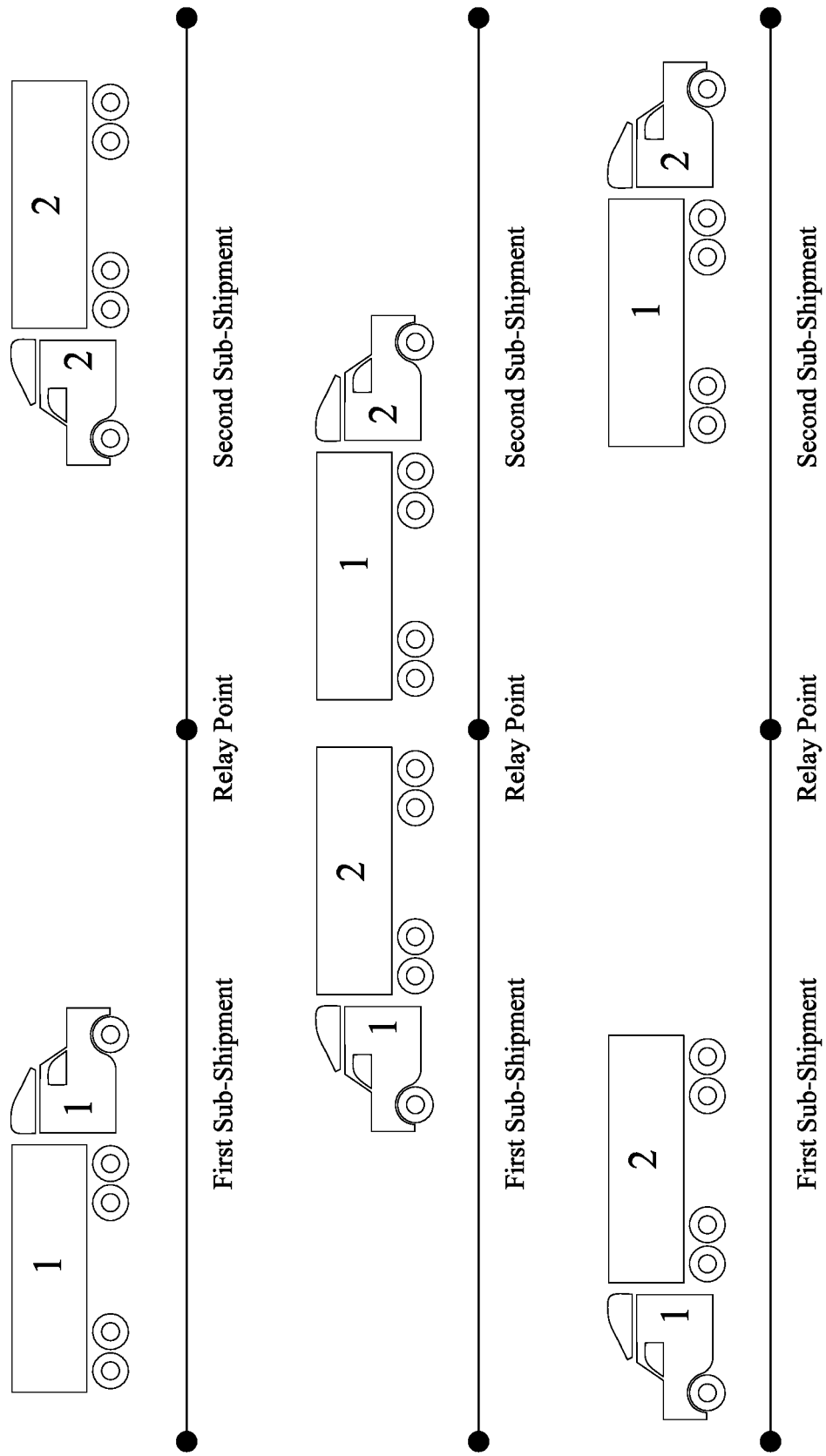
FIG. 8 depicts an example diagram illustrating transporting shipments using a relay system.

Further, in some examples, the matching engine 130 can divide a shipment request into separate components. For example, the matching engine 130 can arrange for a shipment to be completed by multiple carriers using a relay system as depicted in FIG. 8. As illustrated in FIG. 8, truck 1 and truck 2 can each carry trailers 1 and 2, respectively, and meet at an intermediate location, or a relay point, along the shipments' routes. The shipment system 1 can determine the relay point based on data associated with the shipment requests, location information from map data (e.g., point of interests, common locations to stop, locations and their proximities to roadways, etc.) and/or data associated with the trucks (e.g., their current locations, route the trucks are on or expected to travel on, navigation or route information, estimated travel time and/or estimated time of arrival to a particular location, etc.). Once the trucks meet at the relay point, the trailers 1, 2 holding the respective shipments can then be exchanged (e.g., the trailers can each be untethered or unhooked from the trucks and switched). Thus, truck 1 can carry a shipment in trailer 1 along a first portion of the route from the shipment's pickup location towards the shipment's delivery location (a first sub-shipment) and truck 2 can carry the shipment in trailer 1 along a second portion of the route from the shipment's pickup location towards the shipment's delivery location (a second sub-shipment). Even further, as shown in FIG. 8, relay systems can operate simultaneously in both directions, with each truck arriving and leaving with a different trailer at the relay point. After exchanging the shipments, the respective trucks can each travel towards their respective origins, for example.

Figure 9:
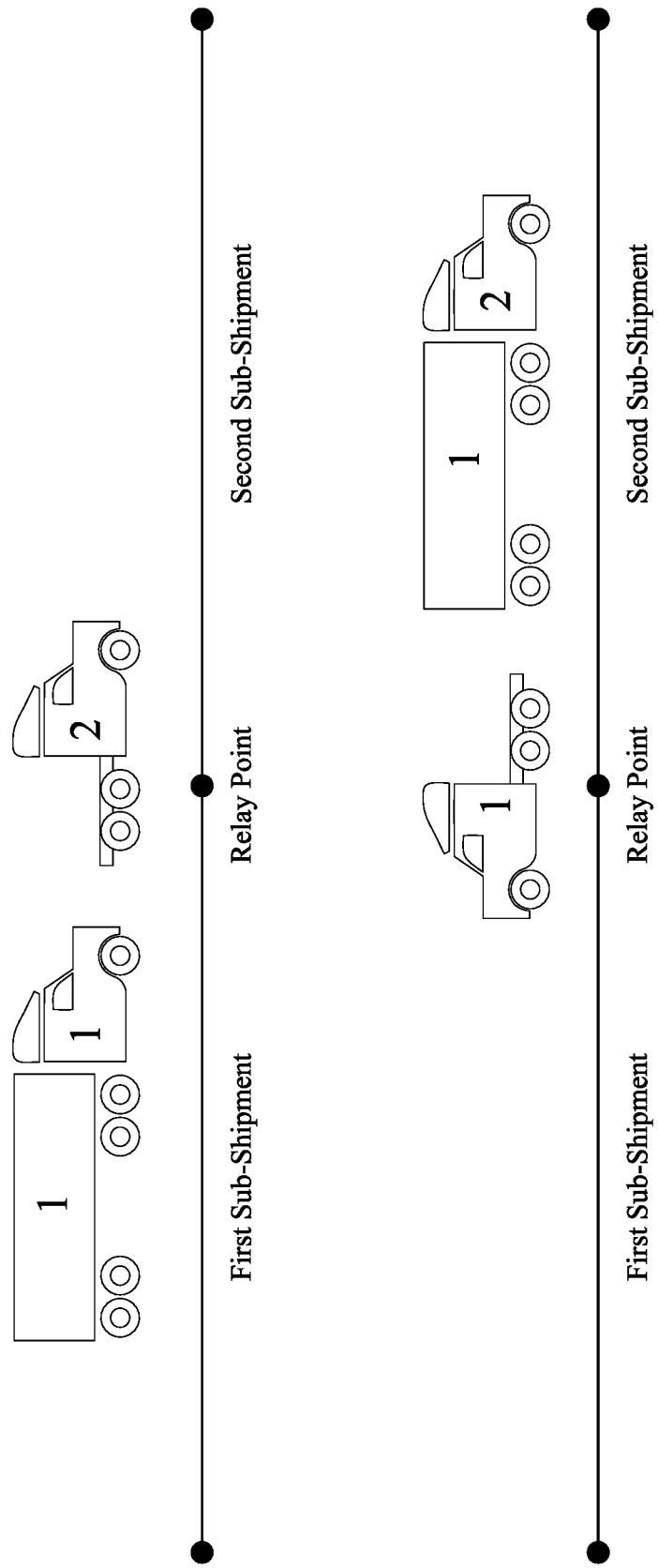
FIG. 9 depicts an example diagram illustrating transporting a shipment using a relay system.

Another embodiment relay system is depicted in FIG. 9. As illustrated in FIG. 9, a truck 2 with no trailer can be ready and waiting at the relay point. Advantageously, the waiting truck 2 and its operator can perform any tasks that cannot be done while driving before the shipment arrives, such as refueling, eating, maintenance, and off-duty time. After the transfer, the truck 1 that initially carried the shipment can perform similar tasks as necessary until another shipment arrives from either direction. This subsequent shipment can optionally be planned in advance.

In some implementations, the relay system requires an increased amount of coordination between multiple carriers. For example, the benefit of the relay system can be diminished if a carrier with the shipment or the subsequent carrier of the shipment is late to the relay point. Further, relays can be difficult to arrange between multiple carriers, particularly if those carriers are not already operating in a single fleet. The shipment arranging process, as described herein, can facilitate the scheduling of these relays to prevent uncertainties and delays. Still further, sensors on the vehicles can provide data to the shipment system 1 that can be processed to determine when a shipment is expected to arrive (and whether it would be early or late, as compared to a previously estimated time for relay). Each sub-shipment in the relay can be treated as an individual shipment, and thus these early or late arrivals can be treated in ways similar to the modification of a shipment, as discussed herein, which can be coordinated using the matching engine 130. In some examples, in the context of autonomous trucks, the relay locations and times can be adjusted in real-time based on the expected future location of the trucks under autonomous driving. For example, a relay location might be adjusted in real-time to optimize operator time, truck time, fuel efficiency, costs at a truck stop, and/or other characteristics of the shipment process. In such an example, the automation of the driving process can improve the predictability of arrival time, fuel costs, and/or wear-and-tear on the vehicle. These features can also be provided with non-autonomous vehicles, in other examples.

In some embodiments, the matching engine 130 can arrange a relay system by dividing the shipment into two or more sub-shipments and offering them to various carriers as separate independent shipments using techniques similar to those discussed above. These shipments can then be confirmed once a carrier has been found for each sub-shipment.

Dividing the shipments into separate sub-portions can provide a variety of benefits. For example, the sub-shipments can provide a carrier with consistent shipments to carry without needing to travel far from a starting location or a pickup location that might also serve as (or otherwise be sufficiently near) a home for the operator or truck. Staying nearby reduces the concern for deadhead driving to return home, allows the truck and operator to return home at the end of each day, facilitates maintenance operations with familiar mechanics, and allows the truck to be tuned for consistent nearby road conditions (different truck components are better for flat versus hilly conditions, high traffic versus low traffic, temperature and weather, and other factors). In some embodiments, the shipment system 1 can assign shipments such that one or more trucks never travel beyond a specified or predefined distance from a home location, such as 150 miles. Still further, as an addition or an alternative, the distance from the home location can also be limited by the distance a truck can reliably travel without needing to refuel and/or by the distance a truck can reliably travel without needing a human operator to take time off-duty (for example, due to driving regulations). Thus, the shipment trailer can continue traveling via the relay system without needing to stop while the truck is refueled, an operator is off-duty, or otherwise.

According to some examples, the relay system can facilitate modifying the shipment system's "bandwidth" (the number of shipments executed through the system) without changing the number of carriers. For example, if it is determined that an excess of carriers is available (e.g., the number of carriers exceeds a threshold ratio or threshold number as compared to a number of shipments), then the shipment system 1 can communicate with the carrier devices 30 to reduce driving speeds (and thus improve fuel efficiency and reduce wear-and-tear) to the extent possible while still meeting delivery time requirements. Similarly, if it is determined that an insufficient number of carriers are available under current driving behavior, then the shipment system can communicate with the carrier devices 30 to increase driving speeds to the extent possible (e.g., based on preconfigured speed rules or parameters along different segments of the route), such that an additional shipment can be executed in a set period of time. For example, in a relay system, a single truck can execute four sub-shipments in a day at normal (average) speeds and then can increase its speed to execute five sub-shipments if necessary. If every requested full-shipment requires four sub-shipments, then a fleet of four trucks can execute four full shipments at normal speeds, but five full shipments at higher speeds. Because five trucks would also execute five full shipments at normal speeds, four trucks at increased speeds can act like five trucks by making this speed adjustment. Thus, the shipment system 1 can communicate with the trucks to increase their speeds (for example, by modifying shipments, as discussed herein) to increase the bandwidth of the system as necessary.

In some embodiments, the shipment system may increase or decrease speeds for a plurality of carriers by a specified percentage (e.g., at least 5%, 10%, 20%, or 30%, etc.). However, in some instances, these adjustments may not be as effective outside the context of relay systems due to the discrete nature of the shipments. A carrier assigned to execute a shipment that would take one full day at normal speeds might be able to increase its speed by 30% and thus be capable of executing 30% of another shipment. Absent another truck being available to finish the remaining 70% of that shipment by the requisite time, executing only 30% of the shipment is not valuable.

The matching engine 130 can determine how to distribute shipments amongst the carriers, as single shipments, as groups of shipments for single carriers, and/or as a group of sub-shipments to complete single requested shipments. As described, the methods and processes provided (e.g., such as FIG. 2, 3, or 7) can be used to assign shipments. Similar methods can also be used by the matching engine 130 to determine whether a shipment is to be separated into multiple sub-shipments.

Figure 10:
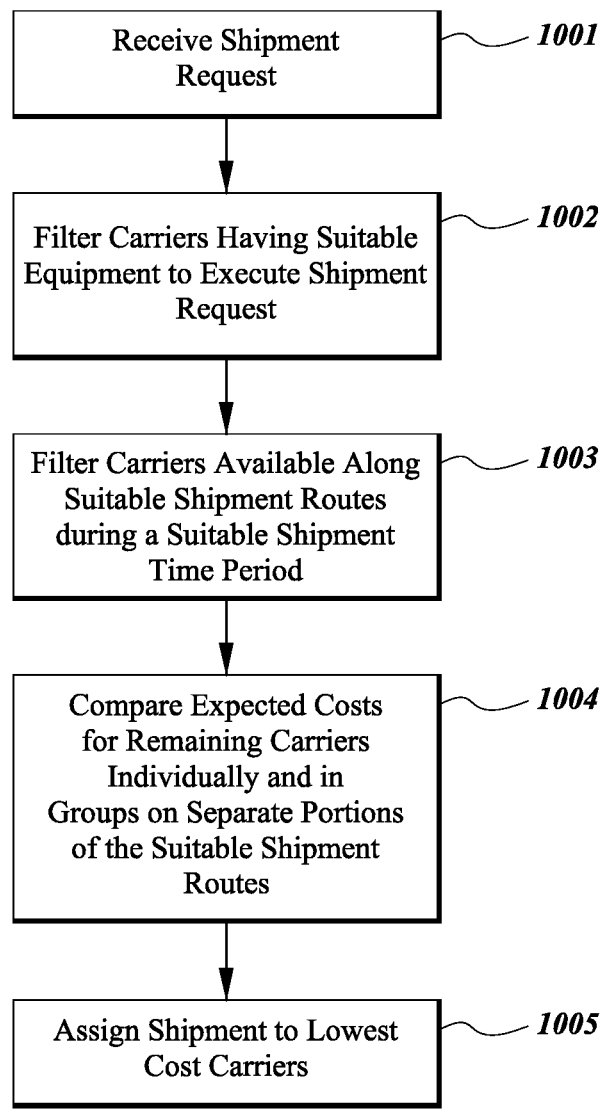
FIG. 10 depicts an example diagram illustrating assigning a shipment to one or more carriers.
Figure 11:
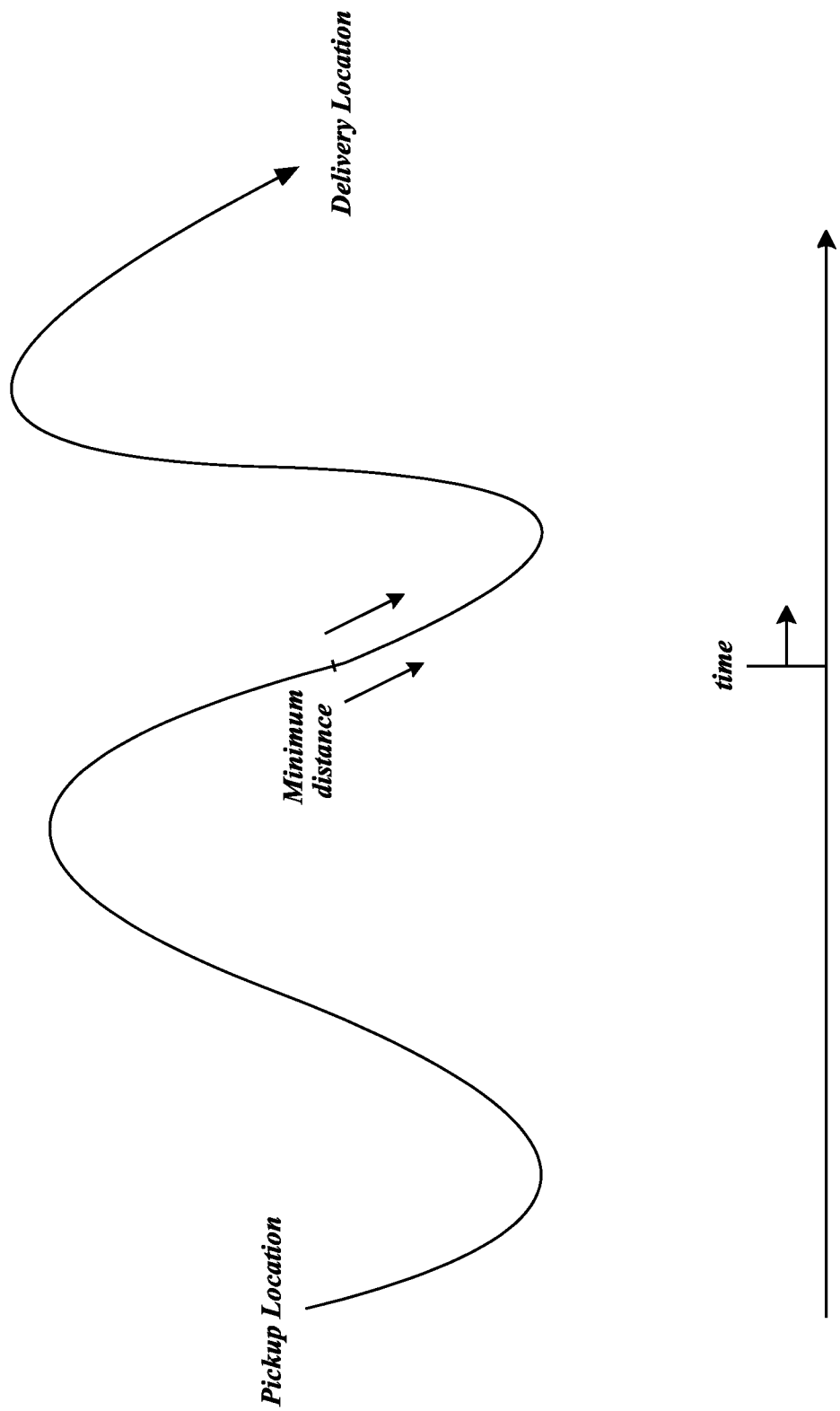
FIG. 11 depicts an example illustration of a route of travel for a shipment, and a minimum distance the shipment must travel by a given time.

The method depicted in FIG. 10 describes an exemplary process performed by the matching engine 130 to determine whether the shipment is to be separated into multiple sub-shipments. As illustrated in FIG. 10, the shipment system 1 can receive a shipment request 1001 (e.g., such as described in FIG. 7), and one or more carriers can be identified based on the data associated with the shipment request and carrier information. For example, the shipment system 1 can access a carrier database and filter carriers from a pool of carriers based on the required equipment 1002. Still further, according to one embodiment, instead of only searching for carriers available to both pickup and deliver a shipment at the requested times, the shipment system 1 can identify one or more carriers that can travel along any sub-portion of a route determined to be suitable to execute the shipment, during times between the pickup time and the delivery time 1003. Thus, a carrier not available for the entire duration of delivery of a shipment can still be considered as an available carrier if it is determined to be available during a sub-portion of the route at a location appropriate for a relay during that time period. For example, as illustrated in FIG. 11, for a given route, the shipment system 1 can determine a minimum distance the shipment must travel by a given time to still be able to complete the shipment by the shipment delivery time, and then identify one or more carriers available to perform a sub-shipment within the remaining distance and time available. The shipment system 1 can use the estimated costs per unit distance, the amount of the distance that can be carried by a single carrier, and/or the diversity of carrier options along a portion of the shipment route to determine one or more sub-shipments 1004. The shipment system 1 can assign the shipment or sub-shipment(s) to one or more carriers 1005. In one embodiment, the shipment can be assigned to a carrier based on cost (e.g., the lowest cost carrier can be assigned first). As an addition or an alternative, if only one carrier is available in a specific portion of the route, or if all carriers on that portion require substantially similar pickup and delivery times, then that portion can be assigned first.

Figure 12:
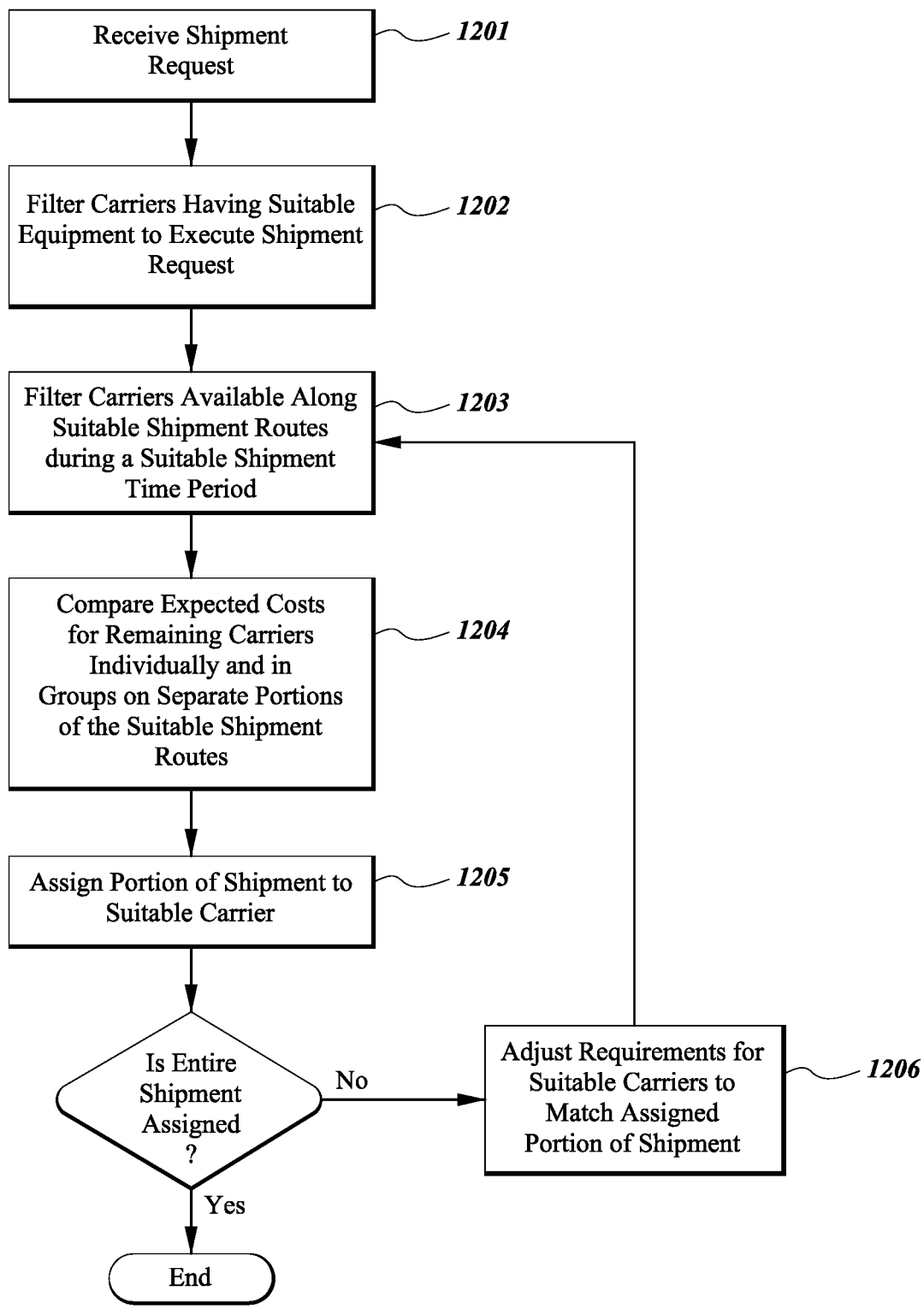
FIG. 12 depicts an example method for assigning a shipment to one or more carriers.

Additional sub-shipments and carriers can then be determined to complete the requested shipment using the same method or similar process iteratively, such as illustrated in an example of FIG. 12. Referring to FIG. 12, with each sub-shipment assigned, the requirements for suitable carriers can be adjusted to coincide with the sub-shipments already assigned 1206. The remaining carriers can then be further filtered to meet the requirements of the already determined sub-shipments. This process can continue until the entire shipment has been assigned. The matching engine 130 can also use other methods, such as those described in FIG. 2, 3, or 7, for example, to assign the remaining portions of the shipment. Further, methods such as those described in FIG. 7 can be used to compare the total cost of a relay system to carriers available to complete the entire shipment alone.

According to an embodiment, the matching engine 130 can also use or implement a relay system to arrange a shipment, or even initiate execution of a shipment, prior to having trucks assigned to complete the entire shipment. As discussed herein, in some embodiments, the shipment system 1 can accept a shipment request from a shipper without having a carrier assigned to execute the shipment, based on an expectation that a carrier will be available at a future time. For example, the shipment system 1 can determine, based on historical data, a probability score that a carrier will be available at a future time. Similar methods can also be used with a relay system, where each sub-shipment can be treated as a future shipment that has been accepted by the shipment system 1. Further, if sufficient carriers are already engaged with the shipment system 1, particularly in a relay(s), the shipment system 1 can determine the availability of a carrier(s) to complete the shipment using either a carrier(s) that is currently available to execute the shipment during the relevant time, or alternatively by increasing speeds of vehicles operating with the shipment system 1 to increase bandwidth such that one or more carriers that would otherwise not be available is now available to execute the new shipment. Thus, relays can facilitate the acceptance of shipments without a particular carrier assigned, knowing that additional bandwidth for that shipment can be created by increasing the speed of multiple carriers in the system.

To facilitate the efficient assignment of shipments using the matching engine 130, it can be advantageous for carriers to commit to being available for a variety of potential shipments over a specific time period. For example, as discussed above, a carrier can agree to be available for a given date(s) and time period(s), conditional on criteria, such as a minimum payment for the entire time or per unit time, return to a specific location at a given time, and/or compensation for related expenses (such as food, fuel, wear-and-tear, and tolls), and provide information about the truck capabilities. By accessing stored data indicating that the carrier will agree to certain shipments allows the matching engine 130 to immediately identify a carrier and assign a shipment to the carrier when a shipment request is received and processed, and in some examples, also allows for the shipment system 1 to immediately accept shipment requests from carriers without needing to verify a carrier's availability and capability. Still further, using data collected from the sensors of a vehicle as discussed herein, the shipment system 1 can also predict the future availability of a carrier that is not currently available, and assign shipments accordingly. According to another example, the autonomous driving of carrier trucks can enable the shipment system 1 to generate a more accurate estimate of the future availability of the carrier, based on an expected driving time of the autonomous vehicle. Road conditions can also be used to predict the future availability. Autonomous driving of the vehicle can also allow the shipment system 1 to adjust the future availability of the carrier by adjusting the speed of autonomous driving. For example, as discussed herein, speeds can be adjusted to meet a modified shipment, increase relay system bandwidth, or ensure that a delivery can be completed within a previously specified time.

Road Information Database

Information about the roads traveled by the carriers can be used to estimate travel times, determine optimal routes, and determine if autonomous driving is appropriate. Data related to the roads can be collected from a variety of sources. As discussed herein, in some embodiments, a vehicle can include a set of sensors 520 that can measure characteristics of a road and the surrounding vehicle's environment, such as weather conditions, traffic conditions and road hazards, construction zones, and other characteristics. The vehicle sensors 520 (including sensors on the separable carrier devices 30) can also detect the road conditions. For example, accelerometers (e.g., vertically-oriented accelerometers) on the vehicle can detect potholes, bumps, or other non-smooth road conditions. The vehicle speedometer can determine the speed at which the vehicle moves, which can be used by the device and/or the shipment system 1 to determine traffic conditions along a segment of a road. Engine temperature sensors can also provide an indication of environmental temperatures or whether the vehicle requires some time to break.

Road information can also be collected from other sources, such as from third party systems. This data can be collected over one or more networks, such as the internet, and/or from data collected by mapping services. The data can include weather conditions, traffic conditions, construction zones, and other transitory characteristics. The data can also include non-transitory characteristics, such as speed limits, local autonomous driving regulations, locations of traffic signals and road signage, weigh stations and their hours of operation, bridge clearance heights, fueling stations and associated prices, restaurants, and local GPS stations (such as Differential GPS stations). The non-transitory characteristics can also include detailed geometric characteristics of the roads, such as the locations of lane markers dividing lanes, the width of road shoulders and medians, the slope of a road at any given point, and other factors. These geometric characteristics can be determined at high precision.

Road information can also be processed and interpreted in a manner particularly relevant for autonomous driving. For example, particular routes might be evaluated to determine to what extent the vehicle can be driven safely autonomously (e.g., without human operation). Relevant characteristics such as the quality of mapping data, lane-marker visibility, expected numbers of pedestrians, school or construction zones, proximity to local GPS stations or availability of GPS data (for example, in canyons or near tall buildings), and lane width can be used to determine if autonomous driving is acceptable. Even further, various routes or sections of roads can be tested by autonomous vehicles to verify the suitability of autonomous driving in various conditions (for example, in daytime, nighttime, rain, snow, or ice). All of this information can be collected and stored in a road information database 140, such as depicted in FIG. 1.

The road information database 140 can be used by the matching engine 130 to facilitate the determination of appropriate and preferred routes for delivering freight from a pickup location to a delivery location. For example, the shipment system 1 can identify a set of different routes between the pickup and delivery locations, and then compare them against a variety of criteria, such as driving time, expected fuel costs (fuel consumption and refueling costs), expected availability of autonomous driving, expected human operator costs, expected wear-and-tear on the vehicle, availability of relays, availability of backup carriers (in case of mechanical failure), and/or other factors. Based on the comparison, the shipment system 1 can score the different routes and transmit data about the different routes (or data for a single determined route) to the carrier device. In one example, the carrier device can use the data to present one or more routes on a user interface, such as a map user interface, and the carrier can choose a route according to their preference. Alternatively, the carrier device can present the highest scored route as the default, and the carrier can alternatively select a different route based on preference. Still further, in another example, shipment system 1 can use data from the road information database 140 and the carrier's preferences to adjust the routes presented to the carrier.

Less-Than-Truckload Shipments

According to some examples, the shipment system 1 can arrange less-than-truckload shipments for shippers and carriers. Less-than-truckload shipments are shipments that do not fill the entire capacity of the carrier's bin or trailer (for example, not filling the entire space in the trailer). In one example, a less-than-truckload shipment can be processed in a similar manner to the shipments discussed above. However, in another example, in view of the potential to carry more than one less-than-truckload shipment at a time, the less-than-truckload shipments can be processed differently by the shipment system 1.

For example, the shipment system 1 can receive data indicating the weight and/or size (e.g., dimensions) of a less-than-truckload shipment requested by a shipper (e.g., along with other information in the shipment request). The shipment system 1 can use this data, along with information about the available capacity of nearby carriers, to determine which carriers are capable of executing the less-than-truckload shipment based on capacity (in addition to other factors discussed herein). This can include carriers that are already carrying or being assigned to execute a first or previous less-than-truckload shipment that is small enough to allow for the second less-than-truckload shipment at the same time, and/or that would travel towards a similar direction to both delivery locations (e.g., the execution of the additional second less-than-truckload shipment would not cause the carrier to detour more than a specified time and/or distance parameters). The shipment system 1 can also verify that the pickup and/or delivery time requirements for each shipment can be met by the same carrier, based on the expected driving times (to pick up one or both less-than-truckload shipments at respective pickup locations and travel to the respective destination locations) and/or the time needed to load/unload the freight at each location. Further, as discussed herein, the vehicle's speed can be adjusted to accommodate the second less-than-truckload shipment if, under normal driving speeds, it would not be able to meet the requirements of both shipments (based on estimated driving time and/or load/unloading time computations). Although the example describes two less-than-truckload shipments being assigned to a single carrier, in other examples, more than two less-than-truckload shipments can be assigned to a single carrier.

In one or more examples, the pricing for the less-than-truckload shipment can be adjusted relative to a full-truckload shipment based on the availability of simultaneous less-than-truckload shipments. This availability can be a known availability, or an expected availability of simultaneous less-than-truckload shipments. The shipment system 1 can respond to a less-than-truckload shipment request by transmitting data corresponding to a computed price the shipment device. After the shipment has been confirmed, the shipment system 1 can automatically reroute an assigned carrier, during its previous less-than-truckload shipment, to also pickup the new less-than-truckload shipment (for example, by signaling the carrier device 30, which can alert a human driver or adjust an autonomous driving of the vehicle).

Insurance

According to some examples, the shipment system 1 can include components for computing, storing, and accessing data associated with insurance costs and coverage (e.g., insurance identifiers, parameters, conditions, etc.) for the carriers and/or for the freight. The insurance for the carrier itself can include damages to the carrier (vehicle, operator, etc.) and/or damages to third-parties. The insurance for the freight can cover damages to the freight while executing the shipment request.

As discussed above, the vehicle and the carrier device 30 can receive data from a set of sensors that provide a variety of information about the vehicle, which can then be transmitted to the shipment system 1 over a network. The shipment system 1 can use the data, which can provide the status of various components on the vehicle (such as a braking system or engine system in poor condition or having failing components), to determine whether there is any damage or injury to the carrier, operator, vehicle, third-parties, or the freight or to determine a probability score of such damage or injury during the execution of the shipment based on a set of rules (e.g., in the next estimated duration of time while the freight is being transported). As an addition or an alternative, the operator or driver of a vehicle can provide inputs on a user interface of the carrier device 30 to provide data about any such damage or injury. The shipment system 1 can also determine the driving tendencies or behavior (e.g., such as sudden braking or turning, sudden acceleration, etc.) of an operator of the vehicle during non-autonomous driving that may make damages more or less likely (e.g., determine the probability score of damage), based on extended historical data over multiple shipments driven. To the extent autonomous driving behavior can be controlled by the operator of the vehicle, past autonomous driving behavior can also be considered. Information from the road information database 140, which can also be supplemented by the sensors on the vehicle, can also be used to determine the likelihood or probability score of damages.

Further, when autonomous driving of the vehicle is expected, the likelihood of damages can also be adjusted based on the expected driving behavior of the autonomous vehicle. If the risk of damages and the value of the cargo are particularly high, the shipment system 1 can adjust the driving behavior of the autonomous vehicle to reduce the risk (e.g., reduce the probability score), for example by adjusting driving speeds, following-distances, lane-merging, and/or other behavior. The shipment system 1 can also compute an expected change in shipment time based on the change in autonomous driving behavior (and/or other factors) such that expected insurance costs can be automatically adjusted with changing pickup and delivery times, or changing routes/itineraries for the shipment.

Information can also be gathered from the vehicle from the most recent driving characteristics. This can be used to detect potential mechanical problems with the vehicle that have only recently developed.

In some embodiments, by using this information, the shipment system 1 can generate and provide a cost of insurance for freight to a shipper automatically based on the requested pickup times, delivery times, level of insurance, and/or other factors. Further, the shipment system 1 can also suggest changes to the shipment request (e.g., to the shipment device and/or to an administrative user of the shipment system 1 via user interfaces) that would significantly decrease the cost of insurance, as it would other costs described herein. Similarly, the shipment system 1 can automatically provide a cost of insurance for the carrier, to the carrier, based on the route(s)/itinerary(ies) selected. In one example, the cost of insurance for the carrier can also be passed-on to the shipper, and be included in the proposed price for the shipment.

The costs of insurance for the carrier can also be presented in multiple ways. For example, the shipment system 1 can provide insurance for one shipment at a time, with a known route and itinerary, carrying known freight. The return trip can also be covered by the insurance. Additionally or alternatively, the shipment system 1 can provide insurance for an extended period of time, such as for a full month or year, using similar data as that described above to estimate the risk of damages. As discussed further below, the shipment system 1 can also prevent use of autonomous driving capability for driving of the vehicle that has not been insured through the shipment system 1. These insurance costs can be used by the shipment system 1 in a manner similar to other costs described herein, such that they are also used by the matching engine 130 when assigning carriers to shipments.

Autonomous Driving Adjustments During Shipments

As discussed above, shipments can be executed using autonomously driven vehicles (or vehicles with at least some autonomous driving capabilities), which can be coupled to or include a carrier device 30. In some instances, autonomous driving can improve the safety and reliability of a moving vehicle. Even further, autonomous driving can allow the vehicle's driving behavior to be automatically updated to meet changing conditions and objectives, based on information received by the carrier devices 30 through sensors 520 and/or through the shipment system 1. For example, the vehicle can be driven autonomously by the autonomous driving system 504 at a speed that optimizes fuel efficiency and reduces wear-and-tear on the vehicle while still arriving at the delivery location at the delivery time, according to locations, times, and/or road conditions provided through the shipment system 1. Adjustments to the autonomous driving system 504 can be made automatically, in real-time, as new data is received or determined by the carrier device 30 regarding both the vehicle's current progress along the route and changing conditions ahead (including changing traffic and weather conditions).

In addition to adjusting a driving speed, the carrier device 30 can also make more adjustments to the behavior of the vehicle during autonomous driving. For example, the shipment selection and execution module 508 can automatically reroute the vehicle if different roads would be preferable based on changing traffic or weather conditions. Similarly, as discussed above, the shipment selection and execution module 508 can adjust a route automatically for other changes, such as a new less-than-truckload pickup, a modification to the delivery time, or a need for an on-board operator to stop (for example, to eat or use the restroom).

In further embodiments, such adjustments to driving speeds and routes can be indicated to a human driving the vehicle. For example, the carrier device 30 can indicate to the driver, via a user interface, a preferred speed or route to maintain, and/or further indicate when the operator is deviating from that preferred driving behavior.

Controlling Use of Autonomous Driving Capabilities

In some embodiments, the shipment system 1 and/or the carrier device 30 can control when autonomous driving capabilities are used on a vehicle (e.g., switch between non-autonomous and autonomous modes of driving).

As discussed above, carrier devices 30 can be in communication with components of the shipment system 1, and further can be integral with or otherwise communicate with components on an autonomous vehicle. Thus, components of the shipment system 1 can be in communication, directly or indirectly, with software components on the vehicle that control autonomous driving, such as the autonomous driving system 504. The carrier device 30 can be configured to disable autonomous driving capability if it detects one or more conditions from one or more sensors of the vehicle, or if a signal is received from the shipment system 1 indicating that autonomous driving should not be used at a specified time, in a specified place, or in some other specified situation. Similarly, the carrier device 30 can be configured to require an activation signal from the operator or driver, or from the shipment system 1 prior to enabling autonomous driving capability. For example, the carrier device 30 can be configured to send a request to the shipment system 1 to enable autonomous driving, and the system can respond with an enablement signal if autonomous driving is determined to be safe at a current time and/or location in the current environment.

A variety of data can be used by the shipment system 1 and/or the carrier device 30 to determine if autonomous driving capability should be enabled. As discussed herein, the appropriateness of autonomous driving can be dependent on data related to safety of driving in general, characteristics specific to autonomous driving safety, regulations related to autonomous driving, and/or other factors. To ensure the safety of driving, the system can require certain information regarding the route that will be driven by the vehicle prior to enabling autonomous driving. For example, the necessary information regarding the route can be based on the shipment request data and/or the shipment assigned through the shipment system 1. Still further, the autonomous driving of the vehicle can be limited to driving based on a shipment arranged by the shipment system 1. Driving related to a shipment arranged by the shipment system 1 can include executing the shipment, and can also include driving to a pickup location and driving from a delivery location to an off-duty location such as a home for the carrier. Information related to the route that will be driven by the vehicle can also be determined in other ways, such as when a user provides that information directly to the system, such as with a carrier device 30. In further embodiments, the determination of enabling and/or disabling autonomous driving can be made in real-time based on the current location and conditions on the road traveled by the vehicle.

Other data can also be used when enabling or disabling autonomous driving of the vehicle. For example, the system can use information related to the vehicle, such as the components on the vehicle and the weight of the freight carried by the vehicle. The autonomous vehicle computing system or carrier device 30 can use this information to adjust the driving behavior. For example, a vehicle with weaker brakes or a heavier weight of freight may need a longer stopping distance or may be adjusted to drive at slower speeds. To verify the accuracy of this information, the vehicle can determine if data from sensors (such as those described herein) is consistent with those components, such as verifying the weight of the vehicle is consistent with expectations. The acceleration of the vehicle resulting from a known throttle or braking output can be dependent on characteristics of the vehicle and the weight of the freight. If the sensor data differs from that which would be expected from the information received, the system can disable autonomous driving until it determines that the expected data and the measured data is substantially matched. In one example, the autonomous driving capability can be enabled only for use related to shipments arranged through the shipment system 1, to ensure that sufficient data regarding the route, vehicle, and freight is available.

Further, in variations, autonomous driving of the vehicle can be restricted in other situations. For example, the autonomous driving capability can be restricted if the insurance cost or coverage for the vehicle and/or the freight being carried by the vehicle has not been confirmed by the shipment system 1. In another example, the autonomous driving capability can also be restricted until the shipment system 1 confirms that the autonomous driving software has been updated (e.g., based on comparing prior version(s) of software with the most up to date version). Still further, the autonomous driving capability can also be restricted until the shipment system 1 confirms that the autonomous driving software has access to current road and weather conditions data. Other data can also be necessary for the enablement of autonomous driving.

In one embodiment, a computer-implemented method of arranging shipments of freight by a carrier can be provided. At least one shipment request comprising a pickup location, delivery location, pickup time, and delivery time can be received (for example, by a shipment system 1). One or more trucks capable of executing the shipment request can then be identified based on at least the trucks' ability to execute the shipment request while driving autonomously for at least a portion of the shipment. The shipment request can be transmitted to one or more operators of the one or more trucks capable of executing the shipment request. Each of these steps can be performed programmatically by a computing system comprising one or more computing devices.

In an example of the embodiment, the trucks' ability to execute a shipment request can be based at least on the truck's expected future location achieved through autonomous driving of the truck related to the execution of a prior shipment request. This can include a change in autonomous driving speed of the truck while executing or returning from the previous shipment request.

In a further example of the embodiment, the trucks' ability to execute a shipment request is based at least on a driver's availability. The driver's availability can be determined according to the number of hours the driver has recently spent in one or more duty statuses including at least one of on-duty and off-duty, or other factors.

In a further example, one or more recommended routes for executing the shipment request can be transmitted, for example from the shipment system to a carrier device. An estimated time of non-autonomous driving on one or more of the recommended routes can also be transmitted. Portions of a route that require non-autonomous driving can be determined based on at least one of lane marking visibility, presence of a shoulder for pulling-over, nearby GPS stations, and local autonomous driving regulations. It itineraries for one or more recommended routes can also be transmitted, and the itineraries can comprise a location and time for stopping to perform at least one of refueling, eating, or being not on-duty.

Even further, a plurality of suggested routes or itineraries can be transmitted and a choice between the routes or itineraries can be requested. A choice can then be received, and future suggested routes or itineraries can be adjusted based on the received choice.

In a further example, the autonomous driving of a truck can be activated to execute the shipment request after receiving an acceptance of the request from the carrier.

In another embodiment, a computer implemented method for providing insurance to an autonomous vehicle carrying freight can be performed programmatically by a computing system comprising one or more computing devices. A potential driving plan for the autonomous vehicle carrying freight can be received. The potential driving plan can include a pickup time, a pickup location, a delivery time, and a delivery location. At least one of a current status and historical data of one or more mechanical components of the autonomous vehicle can also be received. A cost of insurance for damages related to the autonomous driving of the autonomous vehicle carrying freight while executing at least the driving plan can be transmitted.

In an example of the embodiment, an estimated value of freight to be carried by the autonomous vehicle while executing the driving plan can also be received. Similarly, a requested level of insurance for freight to be carried by the autonomous vehicle while executing the driving plan can also be received.

In a further example, the damages can include damages to the freight.

In a further example, autonomous driving of the autonomous vehicle to execute the driving plan can be prevented until the cost of insurance is accepted.

In a further example, a behavior of the autonomous vehicle while executing the driving plan can be controlled to reduce a risk of damages while executing the driving plan.

In a further example, data produced during the most recent autonomous driving of the autonomous vehicle can be received, and used to determine the cost of insurance. This data can optionally be required prior to the step of transmitting a cost of insurance. Extended historical data of the driving behavior of the autonomous vehicle or an operator of the autonomous vehicle can also be received and used in a similar manner.

In a further example, the cost of insurance can include insurance for damages related to autonomous driving of the autonomous vehicle over an extended period of time.

In another embodiment, computer implemented method for adjusting the driving behavior of a vehicle carrying freight can be performed programmatically by a computing system comprising one or more computing devices. A set of route requirements comprising at least a delivery location and a delivery time for the freight can be received. A set of route preference characteristics comprising at least one of current fuel price estimates at a plurality of stations and restaurant locations can also be received. One or more suggested routes for autonomous driving meeting the route requirements and optimizing the route preference characteristics can be transmitted. The suggested routes can include a driving path and at least one stop time and location prior to delivery.

In an example of the embodiment, the vehicle can be an autonomous vehicle, and the suggested routes can include an autonomous driving path. A plurality of suggested routes for autonomous driving meeting the route requirements and optimizing the route preference characteristics can be transmitted. A selected route for autonomous driving from the plurality of suggested routes can be received. Further, the autonomous driving of a freight vehicle can be prevented until a route for autonomous driving is selected. The freight vehicle can be autonomously driven according to the selected route for autonomous driving.

In a further example, these methods can be performed while the freight is carried by the autonomous vehicle while driving autonomously.

In further examples, the set of route preference characteristics further can include truck stop locations and/or at least one of lane marking visibility, presence of a shoulder for pulling-over, nearby GPS stations, and local autonomous driving regulations.

In a further example, it can be determined that the one or more suggested routes can be completed by a driver of the vehicle without violating on-duty time limits.

In a further example, optimizing the route preference characteristics can include at least one of reducing expected fuel costs and expected maintenance costs resulting from autonomous driving on the route.

In a further example, a speed of autonomous driving can be adjusted to reduce at least one of expected fuel costs and expected maintenance costs resulting from autonomous driving on the route while also maintaining an expected delivery time at the delivery time.

In a further example, optimizing the route preference characteristics can include optimizing one or more restaurant choices available to a driver at a stop.

In a further example, a selected route for autonomous driving including a stop at a restaurant can be received. The set of route preference characteristics can then be adjusted to favor similar restaurants.

In a further example, an expected cost difference to stop at a given restaurant and meet the delivery time using autonomous driving can be transmitted.

In another embodiment, a method for alerting a driver of an autonomous vehicle to prepare to drive can be provided. A vehicle carrying at least one human can be driven autonomously. An imminent required termination of autonomous driving can be determined, and the human can be alerted of the imminent required termination of autonomous driving in advance of the required termination of autonomous driving.

In an example of the embodiment, the imminent required termination of autonomous driving can be determined based on an imminent entry into an area with regulations against the autonomous driving, an imminent arrival at a delivery location, an imminent exhaustion of fuel or arrival at a refueling station, potentially unsafe road conditions recognized by sensors on the autonomous vehicle, and/or data received from an external source indicating potentially unsafe road conditions.

In a further example, the alert can be provided less than five minutes prior to the required termination of autonomous driving, and/or more than one minute prior to the required termination of autonomous driving. The alert can be provided using a device worn by the human, with a brief and sudden change in motion of the autonomous vehicle sufficient to be felt by the human but not sufficient to substantively effect the movement of the vehicle relative to other nearby vehicles, or by other features.

In another embodiment, a computer-implemented method for arranging for the shipment of freight can be performed programmatically by a computing system comprising one or more computing devices. The status of one or more trucks potentially capable of completing a shipment request can be received. One or more shipment requests comprising a pickup location, delivery location, pickup time, and delivery time can also be received. An estimated cost for completing the one or more shipment requests based at least on the status of the one or more trucks potentially capable of completing a shipment request can then be determined. An immediate response can be sent to the one or more shipment requests with a price for completing the shipment request.

In an example of the embodiment, a truck's ability to reach the pickup location by the pickup time based on autonomous driving of the truck can be determined.

In a further example, an immediate response can be sent to the one or more shipment requests with a suggested modified shipment request including at least one of a suggested alternative pickup time and a suggested alternative delivery time. The suggested modified shipment request can include a reduced price for completing the modified shipment request.

In a further example, the estimated cost can be determined based on a plurality of trucks cooperatively completing the shipment request. The trucks can cooperatively complete the shipment request using a relay system. If the shipment request were carried by a single truck, the single truck may not be able to execute the shipment and return to the pickup location on the same day under applicable regulations and available driving speeds. However, in the relay system each truck (or at least one truck) can optionally be provided with sufficient time to return to its pickup location or home location on the same day.

Similarly, if the shipment request were carried by a single truck, the single truck may not be able to execute the shipment request without stopping for rest under applicable regulations and available driving speeds. In the relay system the shipment request can optionally be executed without a truck stopping for rest while it is executing the shipment request.

In a further example, the estimated cost can be determined based at least on an expected fuel efficiency during autonomous driving and/or on an expected wear and tear on a truck during autonomous driving.

In another embodiment, computer-implemented method for monitoring and controlling the expected arrival time of a freight shipment by a shipper can be performed programmatically by a computing system comprising one or more computing devices. A current location of a vehicle carrying freight can be received, and an expected time of arrival of the vehicle carrying freight at a delivery location can be determined based at least on the current location. It can also be determined if the expected time of arrival is different from a scheduled time of arrival. An alert can be provided to a recipient of the freight if the expected time of arrival is different from the scheduled time.

In an example of the embodiment, the vehicle can be an autonomous vehicle, and the expected time of arrival can be determined based at least on the expected autonomous driving of the autonomous vehicle. A change in cost for changing the expected arrival time to the scheduled arrival time can also optionally be determined by adjusting a behavior of the autonomous vehicle, and an offer can be made to adjust the behavior of the autonomous vehicle to change the expected arrival time to the scheduled arrival time. Based on that, or other criteria, the behavior of the autonomous vehicle can be adjusted to arrive at the scheduled arrival time.

In another embodiment, a computer-implemented method for monitoring and controlling the expected arrival time of a freight shipment by a shipper can be provided. A request to change a scheduled arrival time of a vehicle carrying freight to a new scheduled arrival time can be received, and an expected change in cost for changing a behavior of one or more vehicles for the shipment to arrive at the new scheduled arrival time can be determined. An acceptance of the expected change in cost can be received, and the behavior of the one or more vehicles can be adjusted to arrive at the new scheduled arrival time.

In an example of the embodiment, at least one of the one or more vehicles can be an autonomous vehicle, and the autonomous driving behavior of the at least one autonomous vehicle can be adjusted. Similarly, the behavior of a plurality of vehicles operating in a relay to carry the freight can be adjusted, such that the freight arrives at the new scheduled arrival time.

In another embodiment, a method for increasing the capacity of a carrier fleet can be provided. A fleet of autonomous freight vehicles can be operated at a speed profile optimized for cost efficiency while moving freight. A set of freight shipments to be carried by the fleet can be determined to require a carrying capacity greater than the capacity of the fleet when operating at the optimized speed profile. The behavior of the fleet of autonomous freight vehicles can be adjusted to operate at a speed profile higher than the optimized speed profile such that sufficient capacity is produced to meet the required carrying capacity.

In an example of the embodiment, the fleet can operate with one or more relays.

In a further example, the cost efficiency can account for fuel efficiency and/or wear and tear on the freight vehicles.

In a further example, a change in cost caused by an adjustment in driving behavior needed to produce sufficient capacity to carry an additional shipment can be determined, and a price to carry the additional shipment can optionally be offered based at least on the determined change in cost.

In another embodiment, a method for optimizing the efficiency of autonomous driving of a freight vehicle is provided. A fuel efficiency profile of a freight vehicle using at least sensors on the freight vehicle can be determined, along with a current location of the freight vehicle. Autonomous driving behavior of the freight vehicle can be adjusted to arrive at a delivery location for freight carried by the freight vehicle by a predetermined delivery time while optimizing fuel efficiency.

In an example of the embodiment, an estimated wear and tear profile of a freight vehicle can also be determined, and an estimated wear and tear of the freight vehicle can also be optimized when adjusting the autonomous driving behavior.

In a further example, data regarding at least one of traffic conditions and weather conditions can be received, and the autonomous driving behavior can also be adjusted to account for at least one of traffic conditions and weather conditions. At least one of traffic conditions and weather conditions can optionally be detected by a sensor on the freight vehicle and/or be received from outside the freight vehicle.

In a further example, an expected time when refueling will be required prior to arriving at the delivery location can be determined, and the autonomous driving behavior can be adjusted to account for time spent refueling. A location to refuel can also optionally be determined. An expected time when refueling will be required can optionally be determined using an expected autonomous driving behavior and an associated fuel efficiency. The fuel efficiency profile can be determined using a weight of freight carried by the freight vehicle, and the weight of the freight carried by the freight vehicle can be determined using sensors measuring the dynamic response of various portions of the freight vehicle during movement.

In a further example, the autonomous driving behavior can also be adjusted to account for a need to stop due to driver on-duty time limits.

In another embodiment, a method for limiting the autonomous driving of a vehicle can be provided. A route for autonomous driving of a vehicle can be approved, and autonomous driving of the vehicle can be prevented until the route is approved. Further, autonomous driving of the vehicle can also optionally be prevented until the route is approved even if autonomous driving on the route is already considered to be safe.

In another embodiment, a method for limiting the autonomous driving of a vehicle to routes approved for autonomous driving can be provided. The appropriateness of a shipment plan under autonomous driving can be verified by comparing the shipment plan with road conditions. The shipment plan can include at least a pickup location and a delivery location. Autonomous driving of the vehicle to execute the shipment plan can be prevented until the appropriateness of the shipment plan under autonomous driving has been verified.

In an example of the embodiment, verification of the appropriateness of a shipment plan under autonomous driving can require verification of the safety of the shipment plan under autonomous driving. Verifying the safety of the shipment plan under autonomous driving can optionally require verifying that a vehicle designated to execute the shipment plan is capable of safely moving a weight of freight under the shipment plan. The shipment plan can include a route and the vehicle designated to execute the shipment plan can be verified to be capable of safely moving the weight by comparing the vehicle's capability, the weight, and one or more uphill and downhill sections on the route. The safety of the shipment plan under autonomous driving can also depend on verification that the components of a vehicle designated to execute the shipment plan are unlikely to fail while executing the shipment plan.

In a further example, verifying the appropriateness of the shipment plan under autonomous driving can use one or more features of a route particularly relevant to the safety of autonomous driving. One or more features of the route particularly relevant to the safety of autonomous driving can include lane marking visibility, the width of a shoulder, and the availability of GPS stations.

In a further example, verifying the safety of the shipment plan under autonomous driving can include verifying that the height clearances along the route are sufficiently high for a vehicle designated to execute the shipment plan to safely pass.

In a further example, the shipment plan can include a pickup time and a delivery time and verifying the safety of the shipment plan under autonomous driving can include verifying that a speed necessary to execute the shipment plan is within safe levels. The safe levels can be different for different portions of the route and/or be adjusted according to a weight of freight to be carried under the shipment plan.

In a further example, the route associated with the shipment plan can be tested under autonomous driving and autonomous driving of the vehicle on the route can be prevented prior to the testing.

In a further example, verifying the appropriateness of a shipment plan under autonomous driving can include verifying that a combined weight of freight of the shipment plan and a vehicle designated to execute the shipment plan is within a predetermined limit.

In a further example, autonomous driving of the vehicle can be enabled after the appropriateness of the shipment plan under autonomous driving has been verified.

In another embodiment, a method for ensuring that characteristics of a freight vehicle are known to the autonomous driving software of the freight vehicle can be provided. Autonomous driving of the freight vehicle can be restricted until at least a stated weight of freight carried by the freight vehicle has been received.

In an example of the embodiment, a weight of freight to be carried by the freight vehicle can be received. The received weight of freight to be carried by the freight vehicle can be compared with data collected by sensors on the freight vehicle indicative of the weight of freight carried by the freight vehicle. The data collected can reflect a dynamic response of the vehicle during movement that is indicative of the weight of freight carried by the freight vehicle. Autonomous driving of the freight vehicle can optionally be terminated if the received weight of freight to be carried by the vehicle is different from the weight of freight indicated by the data collected by the sensors.

In a further example, the received weight of freight to be carried by the freight vehicle can be compared with data collected by weigh station sensors, and similar actions can be taken in response.

In another embodiment, a method for ensuring that autonomous driving software data of an autonomous vehicle has been updated can be provided. Autonomous driving of the autonomous vehicle can be restricted if the vehicle has not received an autonomous driving software data update. The software data update can include a software update and/or updated data relevant to autonomous driving including at least one of road conditions and driving regulations.

In another embodiment, a method for ensuring that autonomous driving of a freight vehicle is covered by insurance can be provided. Autonomous driving of the freight vehicle can be restricted until verification of insurance of at least one of the freight vehicle and freight carried by the freight vehicle has been received. In an example of the embodiment, verification of insurance can be requested from a third party, and the verification can be received.

In another embodiment, a computer-implemented method for reporting autonomous driving activity can be performed programmatically by a computing system comprising one or more computing devices. The time and duration of autonomous driving of a vehicle, and the time and duration of non-fully-autonomous driving of a vehicle can be recorded. Data regarding the times and durations of autonomous driving of the vehicle and non-fully-autonomous driving of the vehicle can be transmitted to confirm that the times and durations are in compliance with on-duty time limit requirements.

In an example of the embodiment a human operator can be notified when nearing a limit based on the on-duty time limit requirements.

In a further example, a human operator of the vehicle can be notified that a shipment plan being executed by the vehicle cannot be completed with the current human operator under the on-duty time limit requirements without the current human operator taking off-duty time.

In a further example, a suggested off-duty time location based on at least the recorded times and durations, the on-duty time limit requirements, and a shipment plan being executed by the vehicle can be indicated to a human operator.

In a further example, times a human operator of the vehicle is on-duty and the vehicle is not being driven can be separately recorded.

In another embodiment, a computer-implemented method for recording the activities of a human operator onboard a freight vehicle can be performed programmatically by a computing system comprising one or more computing devices. A designated human operator of the freight vehicle can be identified and times the freight vehicle is driven fully autonomously under the supervision of the designated human operator can be recorded. The recorded times the freight vehicle is driven fully autonomously can be transmitted to a third party.

In an example of the embodiment, times the freight vehicle is driven while the designated human operator is in the driver's seat can be separately recorded. Similarly, times the freight vehicle is driven while the designated human operator is in the sleeper berth can also be separately recorded. Similarly, times the freight vehicle is driven autonomously while the designated human operator is in position to take control of the vehicle can be separately recorded.

In a further example, the designated human operator can be notified when they are nearing a limit based on on-duty time limit requirements, and/or if a shipment plan being executed by the freight vehicle cannot be completed under the designated In a further example, a suggested off-duty time location based on at least the recorded times, on-duty time limit requirements, and a shipment plan being executed by the freight vehicle can be indicated to a human operator.

In a further example, the recorded times can be automatically transmitted from the freight vehicle during driving of the freight vehicle, when the freight vehicle is stopped at a weigh station.

In a further example, times the human operator is on-duty and the vehicle is not being driven can be separately recorded.

In another embodiment, a method for detecting and reporting various characteristics of a freight vehicle can be provided. A weight of freight carried by the freight vehicle can be estimated using sensors measuring the dynamic response of various portions of the freight vehicle during movement. The estimated weight can be transmitted to a weigh station system configured to verify that the weight of a freight vehicle is within predetermined limits.

In an example of the embodiment, times spent on duty by a human designated to operate the freight vehicle can be detected (for example, with sensors on the vehicle or the human's device), and data representative of the times spent on duty by the human can be transmitted to a system configured to verify that the human's time spent on duty is within predetermined limits.

In a further example, a status of one or more mechanical components of the freight vehicle can be evaluated using sensors measuring the dynamic response of various portions of the freight vehicle during movement. Data representative of the status of the one or more mechanical components of the freight vehicle can be transmitted to a system configured to verify the mechanical safety of the freight vehicle.

In another embodiment, a method for detecting detention time of a freight vehicle can be performed programmatically by a computing system comprising one or more computing devices. A location of a freight vehicle can be measured to determine that the freight vehicle is at one of a pickup location or a delivery location. An amount of time that the freight vehicle remains at the pickup location or delivery location can be determined. A movement of the freight vehicle away from the pickup location or delivery location can be measured.

In an example of the embodiment, measurement of the location can be done with a GPS sensor. Similarly, measurement of the movement can also be done with a GPS sensor.

In a further example, measurement of the movement can be done by measuring the activity of the engine of the freight vehicle.

In a further example, a shipper can be automatically charged for the amount of time that the freight vehicle remained at the pickup or delivery location. This can include adding the charge to the price of a shipment associated with the pickup location and delivery location.

Many other variations on the methods and systems described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various algorithm steps described in connection with the embodiments disclosed herein can be implemented as electronic hardware, computer software, or combinations of both. To clearly illustrate this interchangeability of hardware and software, various illustrative steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative steps, components, and computing systems (such as devices, databases, interfaces, and engines) described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor can also include primarily analog components. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm, and database used in said steps, described in connection with the embodiments disclosed herein can be embodied directly in hardware, in a software module executed by a processor, or in a combination of the two. A software module, engine, and associated databases can reside in memory resources such as in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A network computer system for arranging freight transport, the network computer system comprising:
   one or more processors;
   a set of memory resources to store a set of instructions that when executed by the one or more processors cause the one or more processors to:
   communicate, over one or more networks, with a plurality of carrier devices to determine carrier information, each carrier device of the plurality of carrier devices being associated with a carrier, a freight vehicle of the carrier, and the corresponding carrier information, wherein the corresponding carrier information includes equipment information that is specific to the freight vehicle of the carrier associated with the carrier device;
   receive, over the one or more networks from a shipper device, a first shipment request, the first shipment request including shipment information, a pickup location, and a delivery location;
   assign the first shipment request to a first carrier based, at least in part, on a first determination that the first carrier is capable of executing the first shipment request, the first determination being based, at least in part, on the shipment information and the equipment information of a corresponding freight vehicle of the first carrier;
   monitor sensor information generated from one or more sensors of the freight vehicle of the first carrier and location information from a carrier device associated with the first carrier, to determine that a shipment of the first shipment request is loaded into the freight vehicle of the first carrier, and that transport of the shipment has been initiated by the freight vehicle of the first carrier;
   determine an available capacity of the freight vehicle of the first carrier once the shipment associated with the first shipment request is loaded into the freight vehicle of the first carrier;
   while the freight vehicle of the first carrier is transporting the shipment of the first shipment request, make a second determination to assign a second shipment request to the first carrier based on the determined available capacity of the freight vehicle of the first carrier, the second shipment request including shipment information, a second pickup location, and a second delivery location;
   based at least on the shipment information of the second shipment request, determine a new route that is different from an expected route of the first carrier; and
   transmit, to the carrier device of the first carrier, a data set that identifies one or more locations of the new route while the carrier fulfills at least the first shipment request or the second shipment request.

2. The network computer system of claim 1, wherein the set of instructions further cause the one or more processors to:
   transmit a shipment invitation for the first shipment request to the carrier device of the first carrier in response to the first determination that the first carrier is capable of executing the first shipment request.

3. The network computer system of claim 1, wherein the shipment information of the first shipment request includes at least one of a type of shipment, a size of the shipment, or a weight of the shipment.

4. The network computer system of claim 1, wherein the instructions for determining that the first carrier is capable of executing the first shipment request further cause the one or more processors to:
   based on the equipment information of a freight vehicle of each carrier of a set of carriers and the shipment information, filter the set of carriers to identify one or more carriers that have suitable equipment to execute the first shipment request, the one or more carriers including the first carrier.

5. The network computer system of claim 1, wherein the instructions for determining that the first carrier is capable of executing the first shipment request further cause the one or more processors to:
   based on status information of each carrier of a set of carriers, the equipment information of a freight vehicle of each carrier and the shipment information, filter the set of carriers to identify one or more carriers that (i) have suitable equipment to execute the first shipment request and are (ii) available to execute the first shipment request, the one or more carriers including the first carrier.

6. The network computer system of claim 1, wherein the carrier information further includes an amount of time the corresponding freight vehicle has been continuously operated by the first carrier, and wherein the instructions for determining the first carrier is capable of executing the first shipment request further cause the one or more processors to:
   at a given instance, determine, the first carrier has operated the corresponding freight vehicle within an on-duty time limit.

7. The network computer system of claim 1, wherein the carrier information includes one or more preferences of the first carrier.

8. The network computer system of claim 7, wherein the one or more preferences includes a predefined distance limit indicating a maximum distance the first carrier is willing to travel from the delivery location.

9. The network computer system of claim 7, wherein the first shipment request includes a preferred shipper route, and wherein the set of instructions further cause the one or more processors to:
   transmit a shipment invitation for the first shipment request to the carrier device of the first carrier; and
   wherein the instructions for assigning of the first shipment request to the first carrier is in response to receiving a confirmation from the carrier device of the first carrier.

10. The network computer system of claim 7, wherein the first shipment request includes a preferred shipper route.

11. The network computer system of claim 10, wherein the instructions for assigning the first shipment request to the first carrier is further based on one or more service parameters including a cost associated with executing the first shipment request while utilizing the preferred shipper route.

12. A method for arranging freight transport, the method being implemented by one or more processors of a computing system and comprising:
   communicating, over one or more networks, with a plurality of carrier devices to determine carrier information, each carrier device of the plurality of carrier devices being associated with a carrier, a freight vehicle of the carrier, and the corresponding carrier information, wherein the corresponding carrier information includes equipment information that is specific to the freight vehicle of the carrier associated with the carrier device;

receiving, over the one or more networks from a shipper device, a first shipment request, the first shipment request including shipment information, a pickup location, and a delivery location;

assigning the first shipment request to a first carrier based, at least in part, on a first determination that the first carrier is capable of executing the first shipment request, the first determination being based, at least in part, on the shipment information and the equipment information of a corresponding freight vehicle of the first carrier; and monitoring sensor information generated from one or more sensors of the freight vehicle of the first carrier and location information from a carrier device of the first carrier, to determine that a shipment of the first shipment request is loaded into the freight vehicle of the first carrier, and that transport of the shipment has been initiated by the freight vehicle of the first carrier; and determining an available capacity of the freight vehicle of the first carrier once the shipment associated with the first shipment request is loaded into the freight vehicle of the first carrier;

while the freight vehicle of the first carrier is transporting the shipment of the first shipment request, making a second determination to assign a second shipment request to the first carrier based on the determined available capacity of the freight vehicle of the first carrier, the second shipment request including shipment information, a second pickup location, and a second delivery location;

based at least on the shipment information of the second shipment request, determining a new route that is different from an expected route of the first carrier; and transmitting, to the carrier device of the first carrier, a data set that identifies one or more locations of the new route while the carrier fulfills at least the first shipment request or the second shipment request.

13. The method of claim 12, further comprising:
transmitting a shipment invitation for the first shipment request to the carrier device of the first carrier in response to the first determination that the first carrier is capable of executing the shipment request.

14. The method of claim 12, wherein the shipment information of the first shipment request includes at least one of a type of shipment, a size of the shipment, or a weight of the shipment.

15. The method of claim 12, wherein the first determination that the first carrier is capable of executing the first shipment request comprises:
based on the equipment information of a freight vehicle of each carrier of a set of carriers and the shipment information, filtering the set of carriers to identify one or more carriers that have suitable equipment to execute the first shipment request, the one or more carriers including the first carrier.

16. The method of claim 12, wherein the first determination that the first carrier is capable of executing the first shipment request further comprises:
based on status information of each carrier of a set of carriers, the equipment information of a freight vehicle of each carrier and the shipment information, filtering the set of carriers to identify one or more carriers that (i) have suitable equipment to execute the first shipment request and are (ii) available to execute the first shipment request, the one or more carriers including the first carrier.

17. The method of claim 12, wherein the carrier information further includes an amount of time the corresponding freight vehicle has been continuously operated by the first carrier, and wherein determining the first carrier is capable of executing the first shipment request further comprises:
at a given instance, determining, the first carrier has operated the corresponding freight vehicle within an on-duty time limit.

18. The method of claim 12, wherein the carrier information includes one or more preferences of the first carrier.

19. The method of claim 18, wherein the one or more preferences includes a predefined distance limit indicating a maximum distance the first carrier is willing to travel from the delivery location.

20. A non-transitory computer-readable medium storing instructions that, when executed by a processor of a freight transport arrangement service, causes the freight transport arrangement service to:
communicate, over one or more networks, with a plurality of carrier devices to determine carrier information, each carrier device of the plurality of carrier devices being associated with a carrier, a freight vehicle of the carrier, and the corresponding carrier information, wherein the corresponding carrier information includes equipment information that is specific to the freight vehicle associated with the carrier device;

receive, over the one or more networks from a shipper device, a first shipment request, the first shipment request including shipment information, a pickup location, and a delivery location;

assign the first shipment request to a first carrier based, at least in part, on a first determination that the first carrier is capable of executing the first shipment request, the first determination being based, at least in part, on the shipment information and the equipment information of a corresponding freight vehicle of the first carrier;

monitor sensor information generated from one or more sensors of the freight vehicle of the first carrier and location information from a carrier device associated with the first carrier, to determine that a shipment of the first shipment request is loaded into the freight vehicle of the first carrier, and that transport of the shipment has been initiated by the freight vehicle of the first carrier; and determine an available capacity of the freight vehicle of the first carrier once the shipment associated with the first shipment request is loaded into the freight vehicle of the first carrier;

while the freight vehicle of the first carrier is transporting the shipment of the first shipment request, make a second determination to assign a second shipment request to the first carrier based on the determined available capacity of the freight vehicle of the first carrier, the second shipment request including shipment information, a second pickup location, and a second delivery location;

based at least on the shipment information of the second shipment request, determine a new route that is different from an expected route of the first carrier; and transmit, to the carrier device of the first carrier, a data set that identifies one or more locations of the new route while the carrier fulfills at least the first shipment request or the second shipment request.

* * * * *